United States Patent
Herzog et al.

(10) Patent No.: US 9,346,473 B1
(45) Date of Patent: May 24, 2016

(54) MATERIAL TRANSPORT AND DISTRIBUTION CONSIST WITH CONTROLLED GATED HOPPER CARS AND CONVEYOR SYSTEMS

(71) Applicant: Herzog Railroad Services, Inc., St. Joseph, MO (US)

(72) Inventors: Stanley M. Herzog, St. Joseph, MO (US); Jacob D. Herzog, St. Joseph, MO (US); Ivan E. Bounds, St. Joseph, MO (US)

(73) Assignee: HERZOG RAILROAD SERVICES, INC., St. Joseph, MO (US)

( * ) Notice: Subject to any disclaimer, the term of this patent is extended or adjusted under 35 U.S.C. 154(b) by 0 days.

(21) Appl. No.: 14/933,550

(22) Filed: Nov. 5, 2015

Related U.S. Application Data

(60) Provisional application No. 62/158,888, filed on May 8, 2015, provisional application No. 62/075,641, filed on Nov. 5, 2014.

(51) Int. Cl.
| | | |
|---|---|---|
| *B61D 7/00* | (2006.01) | |
| *B61D 7/30* | (2006.01) | |
| *B61D 7/02* | (2006.01) | |

(Continued)

(52) U.S. Cl.
CPC .. *B61D 7/30* (2013.01); *B61D 7/02* (2013.01); *B61D 7/20* (2013.01); *B65G 67/24* (2013.01)

(58) Field of Classification Search
CPC .............. B61D 7/00; B61D 7/02; B61D 7/14; B61D 7/20; B61D 7/22
See application file for complete search history.

(56) References Cited

U.S. PATENT DOCUMENTS

| | | | |
|---|---|---|---|
| 1,204,620 | A | 11/1916 | Vulgamott |
| 2,637,456 | A | 5/1953 | Felderman |
| 2,637,457 | A | 5/1953 | Barrett |

(Continued)

FOREIGN PATENT DOCUMENTS

| | | |
|---|---|---|
| AT | 507787 | 8/2010 |
| DE | 4104877 | 8/1991 |

(Continued)

OTHER PUBLICATIONS

"Aspects of Materials Handling", by Keshava Chanda Arora et al., p. 74-75, Firewall Media, Jan 1, 2007.

(Continued)

*Primary Examiner* — Jason C Smith
(74) *Attorney, Agent, or Firm* — Erickson Kernell Derusseau & Kleypas, LLC

(57) ABSTRACT

A material transport and distribution consist including an offloading car, a generator car, and hopper cars. The offloading car includes a rotatable conveyor that can offload materials forward of and to the sides of the car. The generator car powers a plurality of hopper car conveyors. The hopper cars include a longitudinal conveyor that overlaps with conveyors of forward- and aft-located cars to enable transport of materials between cars and while the cars are negotiating a turn in the tracks. The hopper car hoppers are divided into chutes with respective guillotine-style gates. Each gate includes a resilient panel that flexes to enable closure of the gate without binding on materials exiting therefrom. A control system is provided to manage the gates and conveyors during offloading based on sensed characteristics of the operation thereof. An interlock system is also provided to initiate a cascading shutdown routine when a fault is detected.

20 Claims, 15 Drawing Sheets

(51) Int. Cl.
*B61D 7/20* (2006.01)
*B65G 67/24* (2006.01)

(56) References Cited

U.S. PATENT DOCUMENTS

| | | | |
|---|---|---|---|
| 2,641,354 A | 6/1953 | Kingsbury | |
| 3,362,585 A * | 1/1968 | Nessim | B01F 15/00194 198/530 |
| 3,596,609 A * | 8/1971 | Ortner | B61D 7/26 105/240 |
| 3,788,504 A | 1/1974 | Holland | |
| 3,794,194 A | 2/1974 | Holland | |
| 3,857,502 A * | 12/1974 | Holland | B60P 1/38 198/311 |
| 4,005,790 A | 2/1977 | Holland | |
| 4,106,643 A | 8/1978 | McGehee | |
| 4,175,902 A * | 11/1979 | Herzog | E02F 3/30 280/764.1 |
| 4,190,394 A * | 2/1980 | Herzog | E01B 27/02 414/339 |
| 4,576,538 A | 3/1986 | Theurer et al. | |
| 4,601,629 A | 7/1986 | Zimmerman | |
| 4,795,264 A | 1/1989 | Riker | |
| 4,795,301 A | 1/1989 | Snead et al. | |
| 4,809,617 A | 3/1989 | Theurer et al. | |
| 4,909,699 A | 3/1990 | Tandy et al. | |
| 4,923,355 A | 5/1990 | Mancini | |
| 4,925,356 A | 5/1990 | Snead et al. | |
| 5,029,532 A * | 7/1991 | Snead | B61C 17/12 105/239 |
| 5,033,932 A | 7/1991 | Compton | |
| 5,151,002 A | 9/1992 | Theurer et al. | |
| 5,197,845 A * | 3/1993 | Snead | B61D 7/32 105/157.1 |
| 5,203,662 A | 4/1993 | Theurer et al. | |
| 5,219,262 A | 6/1993 | Theurer et al. | |
| 5,221,172 A | 6/1993 | Theurer et al. | |
| 5,249,531 A * | 10/1993 | Taylor | B61D 7/28 105/240 |
| 5,277,538 A | 1/1994 | Theurer et al. | |
| 5,289,648 A | 3/1994 | Theurer et al. | |
| 5,341,746 A | 8/1994 | Theurer et al. | |
| 5,347,933 A * | 9/1994 | Mathison | E01B 27/10 104/2 |
| 5,364,221 A * | 11/1994 | Theurer | B61D 3/16 104/2 |
| 5,393,939 A * | 2/1995 | Nasuta, Jr. | G01G 11/003 177/145 |
| 5,400,718 A | 3/1995 | Theurer et al. | |
| 5,423,268 A | 6/1995 | Bounds | |
| 5,513,452 A | 5/1996 | Theurer et al. | |
| 5,527,144 A * | 6/1996 | Herzog | E02F 9/085 414/339 |
| 5,628,606 A * | 5/1997 | Herzog | E02F 3/964 414/339 |
| 5,727,474 A * | 3/1998 | Theurer | B60F 1/046 104/2 |
| 5,944,469 A * | 8/1999 | Theurer | B61D 15/00 213/62 R |
| 5,993,130 A | 11/1999 | Theurer et al. | |
| 5,993,131 A * | 11/1999 | Theurer | B61D 15/00 104/2 |
| 6,067,912 A * | 5/2000 | Miller | B61D 7/28 105/240 |
| 6,073,561 A * | 6/2000 | Theurer | E01B 27/02 104/7.3 |
| 6,345,949 B1 * | 2/2002 | Floor | A01D 90/10 198/833 |
| 6,425,333 B2 | 7/2002 | Theurer et al. | |
| 6,431,084 B1 * | 8/2002 | Gaydos | B61D 7/20 105/240 |
| 6,591,755 B2 | 7/2003 | Theurer et al. | |
| 6,892,648 B2 | 5/2005 | Theurer et al. | |
| 7,192,238 B2 | 3/2007 | Theurer | |
| 7,644,778 B2 | 1/2010 | Rossanigo | |
| 7,845,098 B1 * | 12/2010 | Huebner | E01B 27/04 37/104 |
| 7,997,210 B2 * | 8/2011 | Clark | B61D 7/30 105/240 |
| 2002/0121216 A1 * | 9/2002 | Theurer | E01B 29/11 104/9 |
| 2004/0018072 A1 * | 1/2004 | Theurer | B61D 7/32 414/339 |
| 2004/0018073 A1 * | 1/2004 | Theurer | B61D 7/32 414/339 |
| 2004/0230355 A1 * | 11/2004 | Theurer | E01B 27/00 701/19 |
| 2005/0278982 A1 * | 12/2005 | Herzog | E01B 27/02 37/104 |
| 2005/0281643 A1 * | 12/2005 | Villar | B61D 15/00 414/339 |
| 2010/0251922 A1 * | 10/2010 | Forbes | B61D 7/02 105/240 |
| 2014/0271071 A1 * | 9/2014 | Aaron | B61D 7/32 414/528 |

FOREIGN PATENT DOCUMENTS

| | | |
|---|---|---|
| DE | 4213925 | 8/1993 |
| DE | 9214176 | 11/1993 |
| DE | 9214990 | 12/1993 |
| DE | 10338463 | 3/2005 |
| DE | 102011014265 | 9/2012 |
| EP | 0368046 | 5/1990 |
| EP | 0429713 | 6/1991 |
| EP | 0429714 | 6/1991 |
| EP | 0841232 | 5/1998 |
| EP | 1083262 | 3/2001 |
| EP | 1184248 | 3/2002 |
| EP | 1300312 | 4/2003 |
| EP | 2090490 | 8/2009 |
| EP | 2360316 | 8/2011 |
| FR | 2508950 | 1/1983 |
| GB | 2277725 | 11/1994 |
| WO | 9633930 | 10/1996 |
| WO | 2008101574 | 8/2008 |
| WO | 2012175225 | 12/2012 |

OTHER PUBLICATIONS

Self-Aligning Idlers, Superior Industries webpage, Nov. 6, 2015.
Pulley & Take-Up Catalog, p. A-34, Superior Industries, LLC, Mar. 2010.
International Search Report issued by the International Searching Authority on Jan. 13, 2016 for corresponding International Application No. PCT/US2015/059285.
Written Opinion issued by the International Searching Authority on Jan. 13, 2016 for corresponding International Application No. PCT/US2015/059285.

* cited by examiner

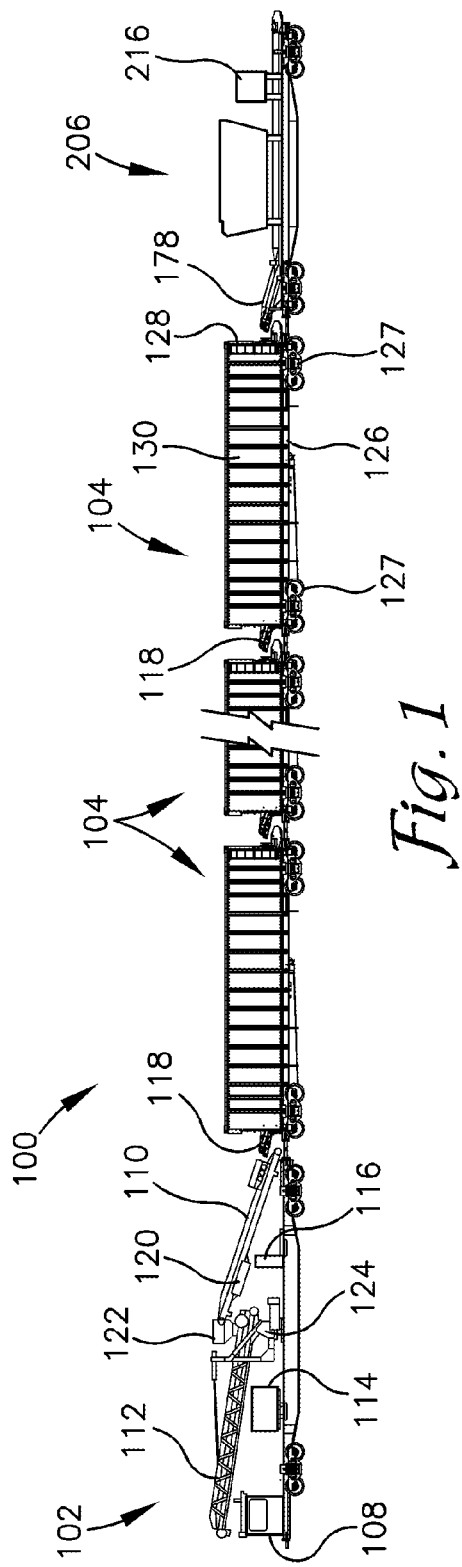
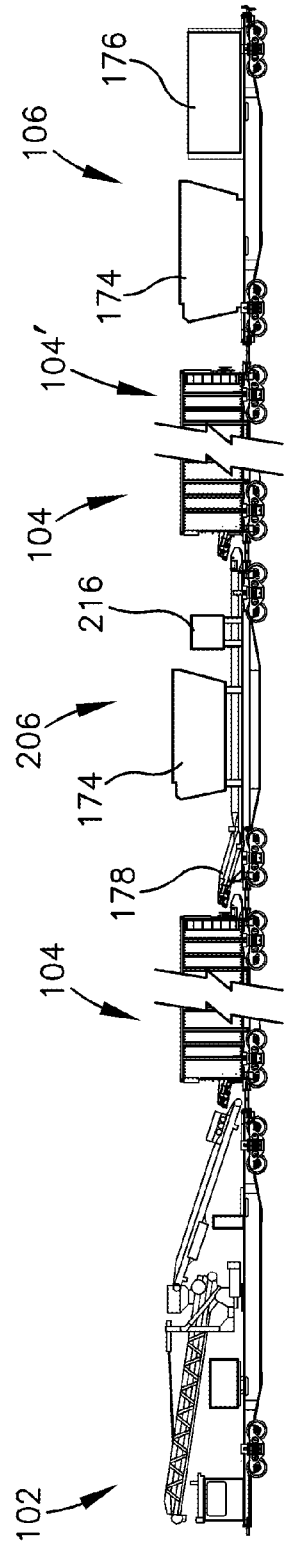

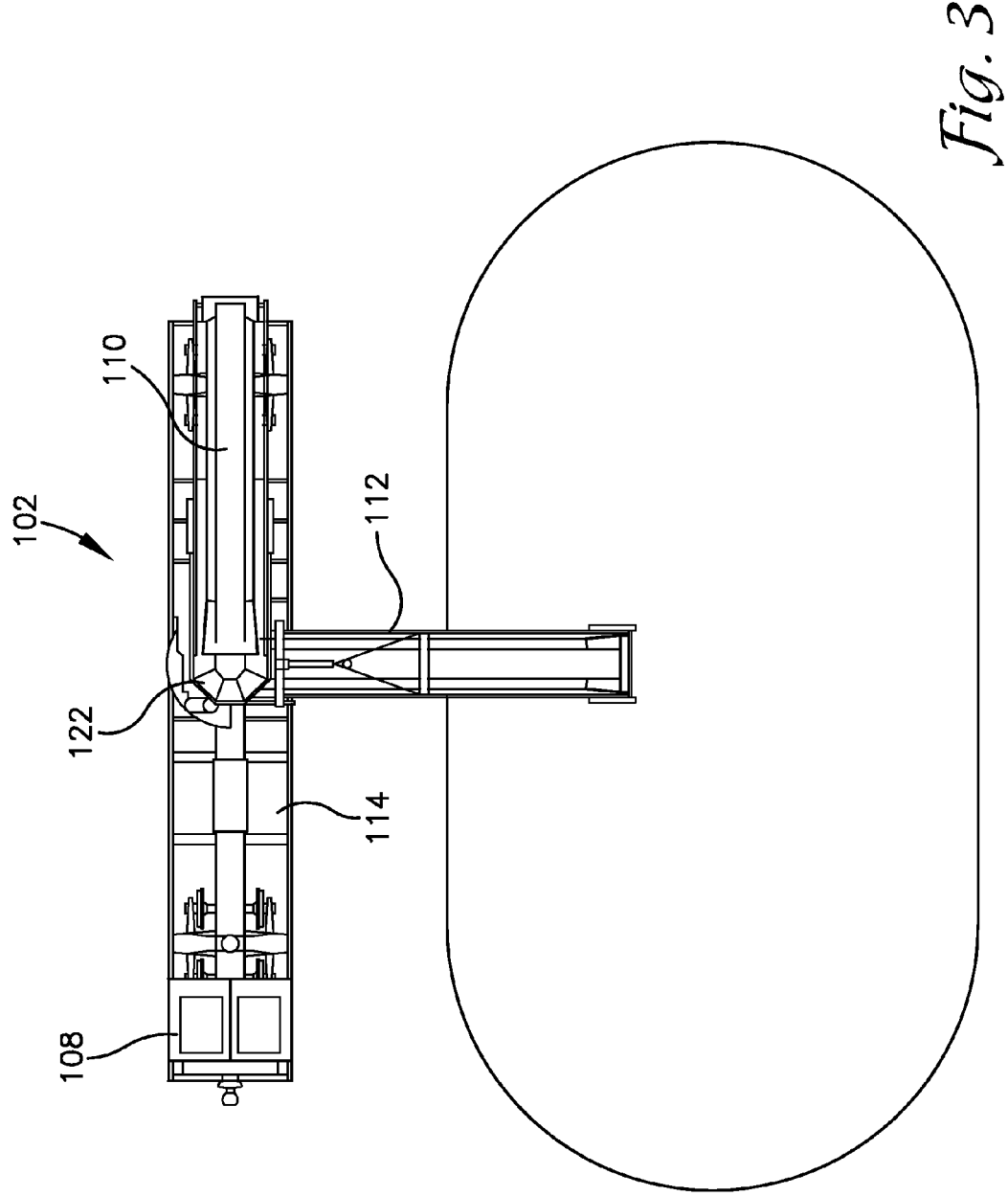

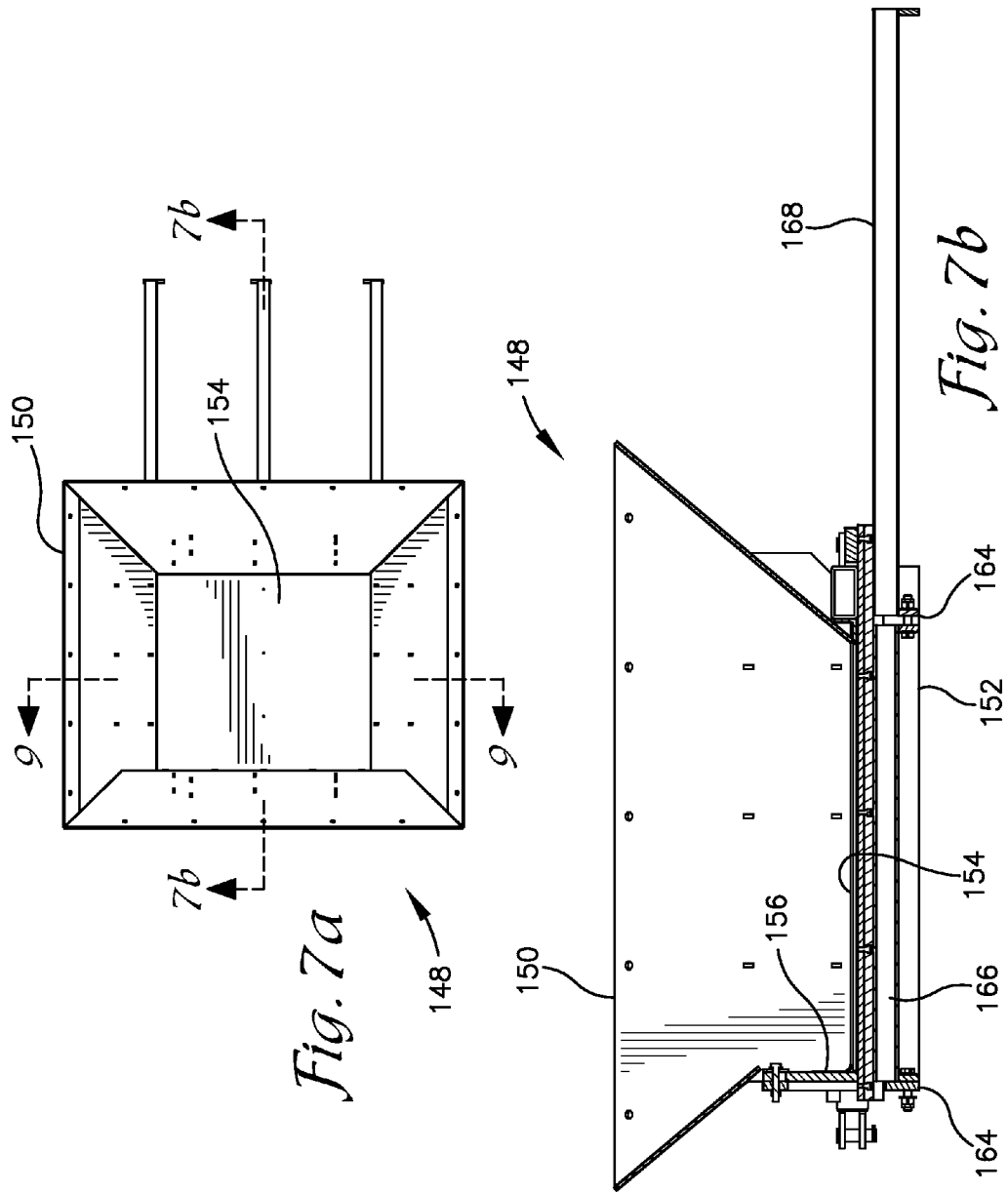

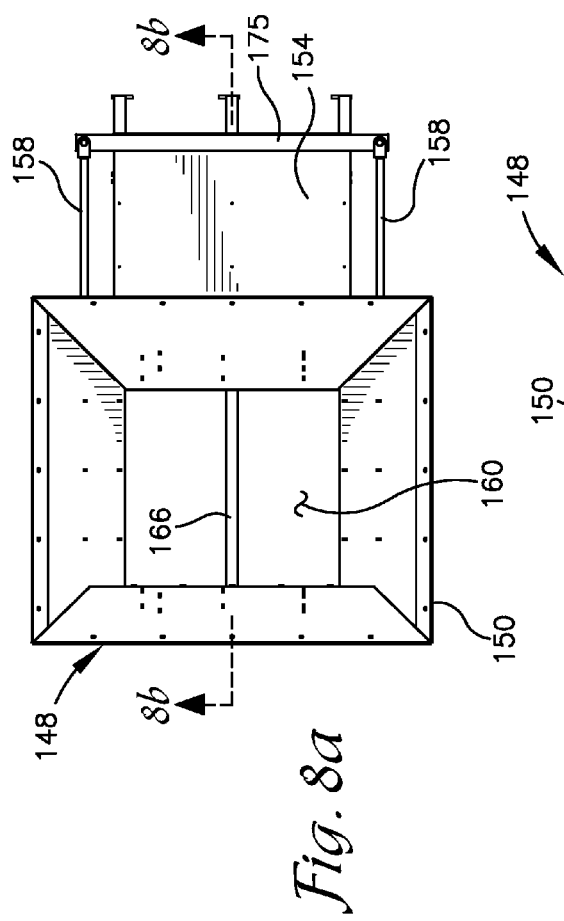
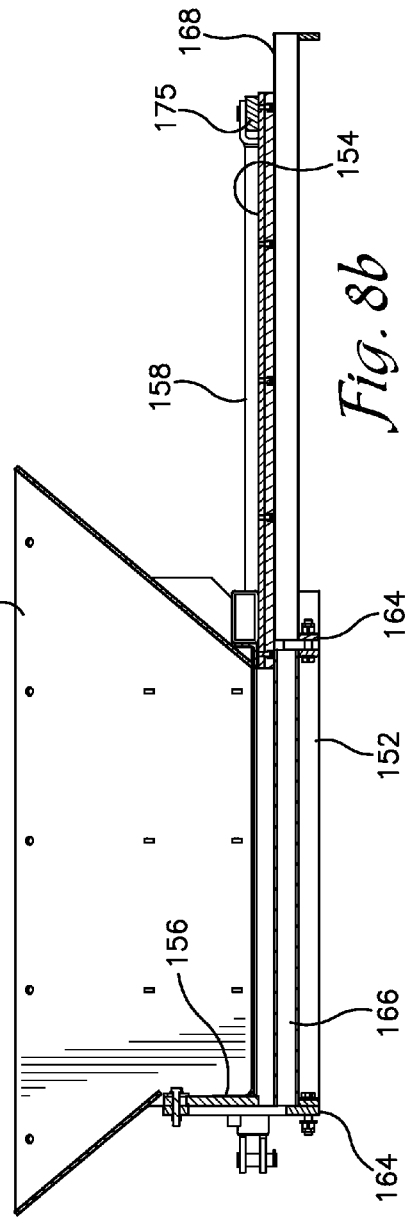

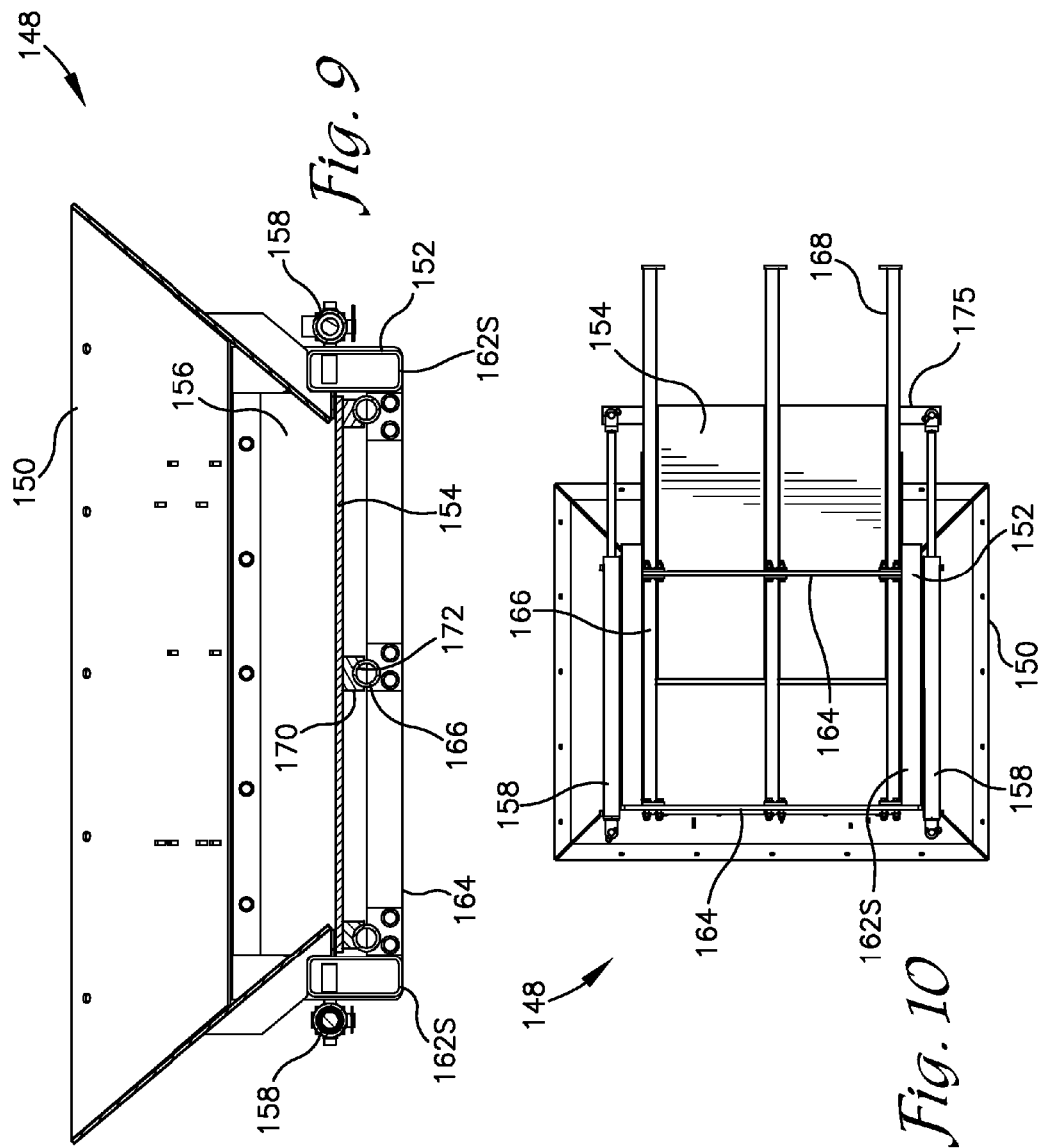

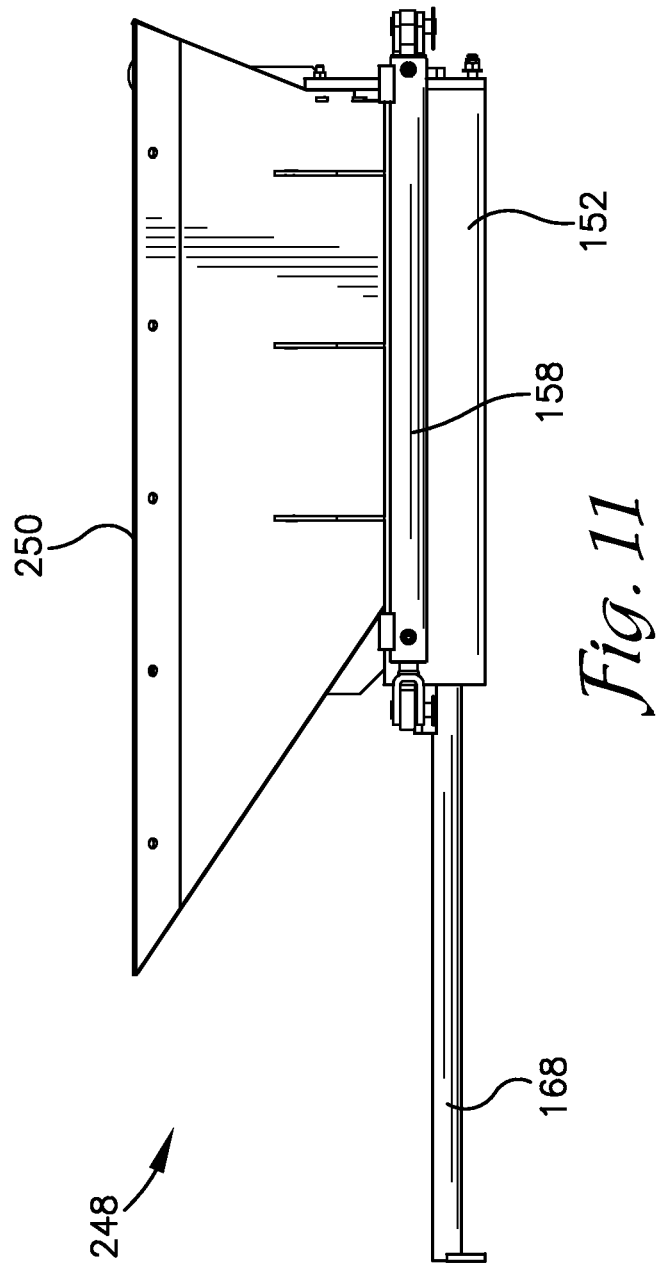

MATERIAL TRANSPORT AND DISTRIBUTION CONSIST WITH CONTROLLED GATED HOPPER CARS AND CONVEYOR SYSTEMS

CROSS-REFERENCE TO RELATED APPLICATIONS

This application claims the benefit of U.S. Provisional Patent Application Ser. No. 62/075,641, filed Nov. 5, 2014 and U.S. Provisional Patent Application Ser. No. 62/158,888, filed May 8, 2015, the disclosures of each of which are hereby incorporated herein in their entirety by reference.

BACKGROUND

Transport and distribution of ballast and other materials along railways is a common task carried out by rail maintenance entities. A variety of transport and distribution systems are available in the art. These typically include a number of hopper cars loaded with ballast material that are transported along the rails to a desired dumping location for unloading. Unloading methods include physically tipping over the entire hopper car, tipping only a hopper portion of the hopper car, opening one or more gates to allow the ballast material to flow out of the hopper, and employing one or more conveyor systems, among others.

Conveyor systems may comprise one or a plurality of conveyor belts extending longitudinally along the length of the hopper car and/or between a plurality of hopper cars. The conveyors may lie beneath the hoppers, may be disposed within the hopper, or a combination thereof. In known systems the conveyors must extend or overlap between adjacent hopper cars to enable transport of the ballast materials between cars and/or along the length of the consist for distribution. In single-belt conveyance systems, e.g. one belt extending between multiple cars, the curve causes the belt to bend, flex, or turn between cars thus causing binding or flexing of the belt and prevents operation thereof.

Gate systems employed with known conveyance systems typically include clamshell or pivoting closure mechanisms in which one or a pair of doors are pivoted between open and closed positions. Other systems may employ guillotine-style gates that slide across an opening, but such guillotine-style gates are typically employed with relatively light weight materials such as grains and organic materials. A problem with known gate systems is that it may be difficult to fully close the gate while materials are moving therethrough; the materials may become pinched, jammed, or crushed between a leading edge of the door/gate and a sidewall of the chute or hopper from which the materials are exiting. Such guillotine-style gates are typically opened and closed using a screw drive system operated by a hand crank, a pneumatic drill, or the like.

Operation of the clam shell gate systems and conveyance systems of ballast hopper cars known in the art is labor intensive, i.e. a plurality of operators are required and each must oversee and operate one or more particular parts of the operation. Known systems also subject the operators to dirty and potentially hazardous conditions. Typically, one operator is positioned on a catwalk disposed along the sides of the hopper cars to open the gates and monitor the flow of material from the hoppers onto the conveyors. The gates are opened and closed using a lever. The operator manually adjusts the degree to which the gates are opened to adjust the amount of material flowing onto the conveyor to prevent the conveyor from overloading. Once a first hopper empties, the operator moves along the catwalk to a second hopper and manually opens the gate to allow material to flow from the second hopper onto the conveyor. A second operator, typically positioned in the cab of the power unit, controls the operation of the conveyor.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a material distribution consist, a hopper gate, material distribution control systems, and methods for their use.

The material distribution consist includes a plurality of hopper cars, an offloading car, and a generator car. Each hopper car includes an individual conveyor extending under a plurality of gated hopper compartments. Each hopper compartment may be formed from inwardly and downwardly sloped sidewalls mounted within the hopper to form a chute with a gate disposed at a lower end thereof. A forward most chute includes a bottom surface and gate disposed at an angle that is inclined toward the forward end of the car.

The gates are opened and closed to control the flow of material from the hopper compartments onto the conveyor. The amount of material deposited on or flowing onto each conveyor is monitored to control the operation of the gates or the conveyor or both. The gates are configured to facilitate opening and closing of the gates while material is flowing through the opening with which the gate is associated.

Each of the gates includes a chute extension coupled to a base frame and a sliding plate that is moveable to close or open an aperture formed by the chute extension. The base frame includes a plurality of support bars extending across the aperture and beyond one side of the gate a distance sufficient to continuously support the sliding plate from the fully open to the fully closed positions. The sliding plate includes a plurality of guides disposed on a bottom surface thereof that are configured to travel along a respective one of the support bars. A resilient panel is provided on the chute extension along a side of the aperture that is adjacent a leading edge of the sliding plate when in the closed position. The resilient panel is configured to at least partially flex to enable the sliding plate to be moved to the closed position when materials are present in the chute, i.e. the materials are not pinched between the sliding plate and a rigid portion of the chute extension. Actuators are coupled between the sliding plate and the base frame to move the sliding plate between the open and closed positions and to positions therebetween.

The conveyor is provided to receive materials exiting the hopper through one or more of the gates. A front or discharge end of the individual conveyor of each hopper car is elevated relative to a rear or receiving end thereof. The hopper cars are connected together so that the discharge end of a conveyor of a one car extends over the receiving end of a conveyor on the adjacent car in the direction material is to be conveyed which may be referred to as the forward direction. Material deposited onto the conveyors is sequentially conveyed forward and deposited onto the conveyor of each successive hopper car in the forward direction and then to the offloading car.

In a preferred embodiment, the conveyor extends generally horizontally along the length of the hopper and includes an upwardly inclined forward portion that extends a distance upward and beyond the forward end of the hopper car a distance sufficient to overlap a conveyor system of an adjacent car. The conveyor includes a motor for operating the belt and may include sensors for monitoring power usage characteristics of the motor and a sensor for monitoring belt speed of the conveyor.

The offloading car includes an operator station, a primary conveyor, and an offloading conveyor. The operator station includes control surfaces and information displays sufficient to enable a single operator to control operation of the material distribution consist. The primary conveyor is configured to receive materials from the conveyor of an adjacent hopper car and to transport the materials to the offloading conveyor. A receiving end of the primary conveyor extends lower than the forward end of the conveyor of the adjacent hopper car. The primary conveyor may include a material scale or weighing system configured to calculate an amount of material transported by the primary conveyor. The offloading conveyor is rotatable or pivotable side-to-side to enable deposition of materials in desired locations alongside the consist or ahead of the consist. The offloading car may also include power sources or generators for providing electrical power to the operator station and/or to drive one or more components of the hopper cars.

The generator car includes a generator configured to produce sufficient electrical power to operate the conveyors on each of a plurality of the hopper cars among other equipment that may be included on the consist. A plurality of generator cars may be provided to increase the number of hopper cars that can be included in the consist. The generator car may include one or more conveyors configured to transport materials between hopper cars located forward and aft of the generator car.

A control system is provided that enables operation of the material distribution consist by a single operator from the control station. The control system monitors characteristics, such as amperage draw, on each of the conveyor motors to determine the quantity of material being carried by each conveyor. The control system also controls the degree or percentage to which each of the gates is opened or closed based on the quantity of material on the conveyors. Thereby, the control system can relatively precisely control the amount of material disposed on the conveyors from the hoppers and thus the amount of material distributed at a desired location. The operation of the hopper gates may also be controlled such that the conveyors are emptied upon completion of the distribution of the desired quantity of materials.

DESCRIPTION OF THE DRAWINGS

Illustrative embodiments of the invention are described in detail below with reference to the attached drawing figures, and wherein:

FIG. 1 is a side elevational view of a material distribution consist depicted in accordance with an embodiment of the invention;

FIG. 2 is a side elevational view of a material distribution consist with more than one generator car depicted in accordance with an embodiment of the invention;

FIG. 3 is a top plan view of an offloading car of a material distribution consist depicted in accordance with an embodiment of the invention;

FIG. 7A is a top plan view of the hopper of FIG. 6;

FIG. 7B is a side elevational view of the hopper of FIG. 6;

FIG. 8A is a top plan view of the hopper of FIG. 6 in an open position;

FIG. 8B is a side elevational view of the hopper of FIG. 8A;

FIG. 9 is a cross sectional view of the hopper taken along line 9-9 of FIG. 7A;

FIG. 10 is bottom plan view of the hopper of FIG. 6 depicted in a partially open position;

FIG. 11 is a side elevational view of an angled hopper depicted in a closed position in accordance with an embodiment of the invention;

DETAILED DESCRIPTION

Figure 4:
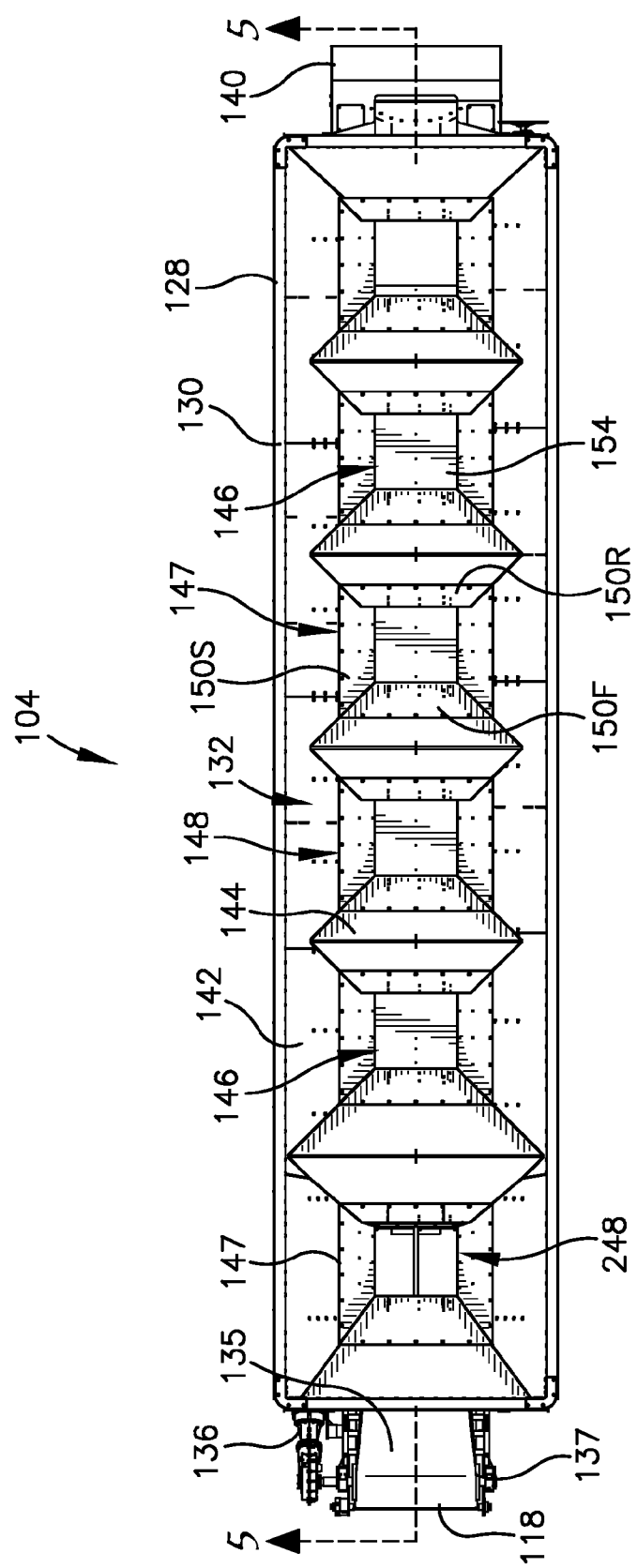
FIG. 4 is a top plan view of a hopper car of a material distribution consist depicted in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention are described herein with respect to the drawings in which reference numerals are employed to identify particular components or features. Similar elements in the various embodiments depicted are provided with reference numerals having matching second and third digits but with differing first digits, e.g. element 10 is similar to elements 110, 210, etc. Such is provided to avoid redundant description of similar features of the elements but is not intended to indicate the features or elements are necessarily the same. Four-digit reference numerals are reserved for description of method steps and do not correlate with the three-digit reference numerals used herein.

Embodiments of the invention are described herein with respect to delivery of ballast material, or simply "ballast," at a desired location along a railway or rail system. However, such is not intended to limit the type of material or applications in which embodiments of the invention might be employed. Terms of relativity, such as forward, rearward, aft, above, below, top, and bottom are used relative to the orientation of the objects included in the drawings and with respect to a forward direction of conveying being from right to left in FIG. 1 of the drawings. Material is generally described as being conveyed from a rear end or receiving end of a car or conveyor to a forward end or discharge end of a car or conveyor. It is also to be understood that the material distribution consist of embodiments of the invention described herein may travel in either direction.

With reference now to FIGS. 1 and 2, a material distribution consist 100 is described in accordance with an embodiment of the invention. The material distribution consist 100 includes an offloading car 102, a plurality of hopper cars 104, one or more generator/transfer cars 206, and may include one or more generator cars 106. The consist 100 may include one or more power or drive cars or locomotives (not shown) that couple to the consist 100 to propel the consist 100 along a rail system or one or more of the cars 102, 104, 106 may be provided with or include a propulsion system for driving the consist 100 along the rail system.

The offloading car 102 includes an operator's station 108, a primary conveyor 110, an offloading conveyor 112, a generator 114, and a hydraulic pump 116. The operator's station 108 includes one or more control surfaces, computers, displays, and the like to enable an operator to control operation of components disposed on the offloading car 102 as well as the hopper cars 104 and the generator car 106.

The primary conveyor 110 is positioned near a rearward end of the offloading car 102 and extends at an upward angle toward the forward end of the car 102. The rear end of the primary conveyor 110 is configured to be at least partially longitudinally overlapped by a hopper conveyor 118 disposed on the hopper car 104 located immediately aft of the offloading car 102 and may extend beyond the rear end of the car 102. A scale 120 or other weighing device may be disposed on or integrated with the primary conveyor 110 to measure the weight of ballast materials being transported thereby. The forward end of the primary conveyor 110 is supported above an intake end of the offloading conveyor 112. A chute 122 or other housing may be provided at the forward end of the primary conveyor 110 to direct the ballast materials thereon onto the underlying offloading conveyor 112.

Figure 5:
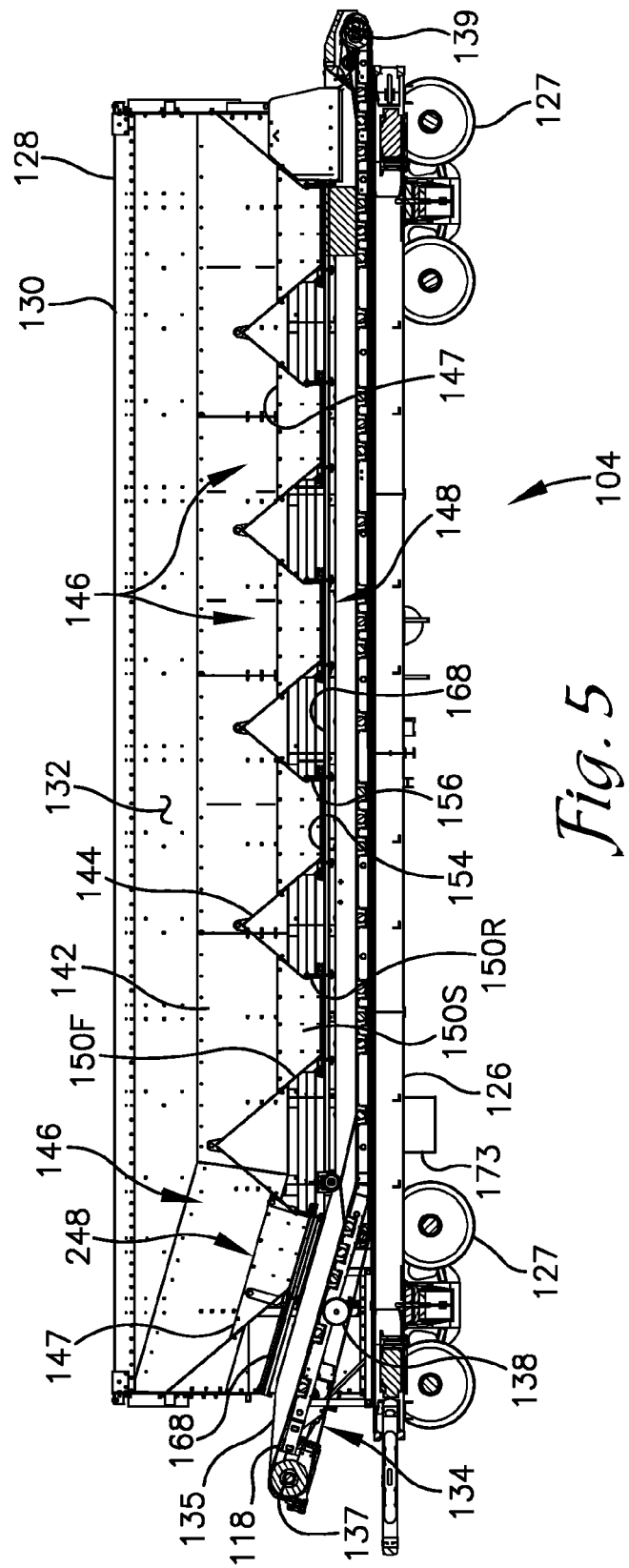
FIG. 5 is a cross-sectional side view of the hopper car of FIG. 4 taken along the line 5-5.
Figure 6:
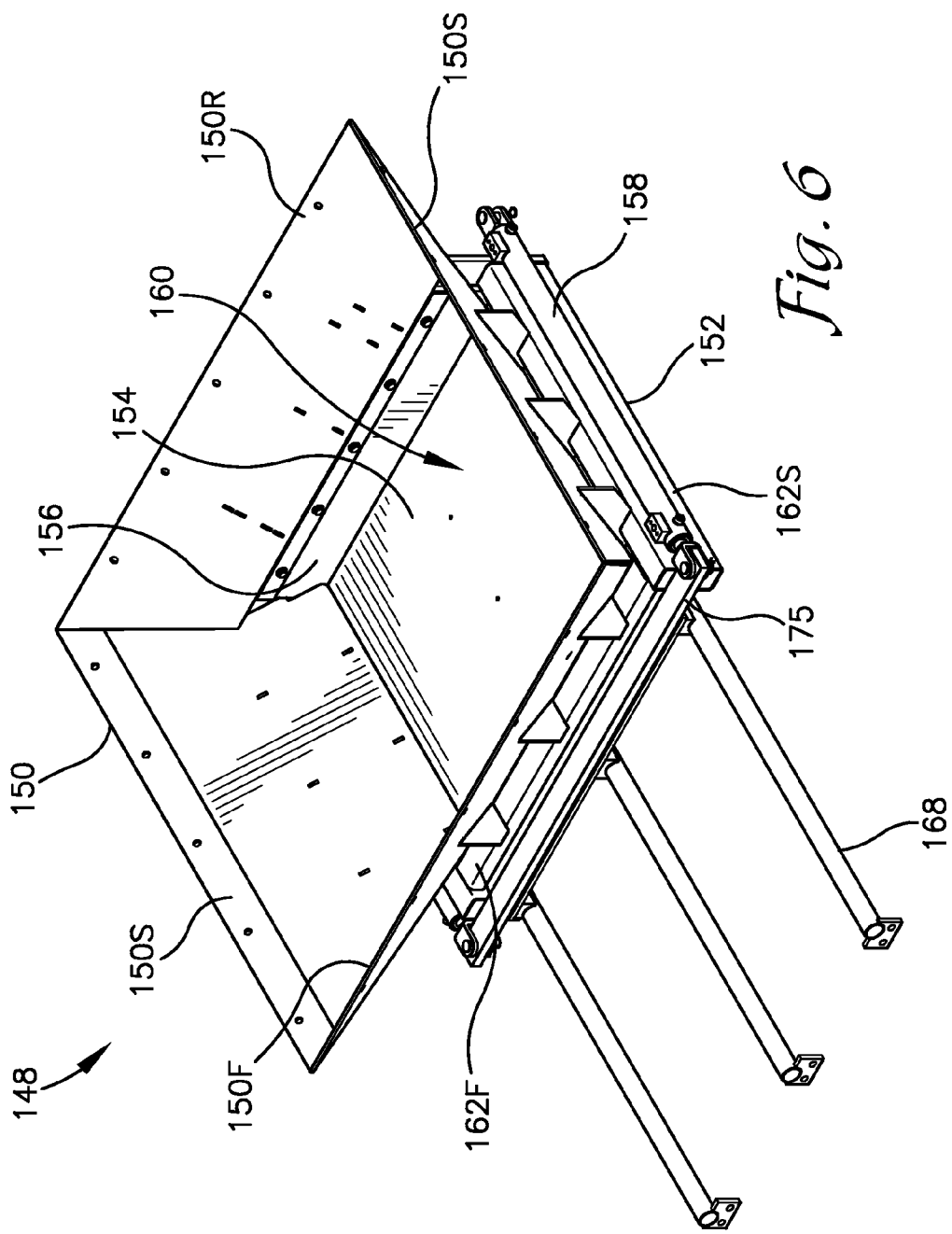
FIG. 6 is a perspective view of a hopper gate in a closed position depicted in accordance with an embodiment of the invention.

The offloading conveyor 112 is rotatably and pivotably mounted on the offloading car 102. The intake end of the offloading conveyor 112 is coupled to a rotatable support structure 124 located generally centrally along the length of the offloading car 102. The support structure 124 is rotatable or pivotable preferably about 180° side-to-side to enable offloading of ballast materials on either side of the offloading car 102, as shown in FIG. 5; greater or lesser amounts of rotation may be provided. The terms "about" or "approximately" as used herein denote deviations from the exact value by +/−10%, preferably by +/−5% and/or deviations in the form of changes that are insignificant to the function. The offloading conveyor 112 may also be positioned to offload materials in front of the consist 100 or at any desired angle to either side of the consist 100. The offloading conveyor 112 extends from the support structure 124 in a cantilevered fashion and may be at least partially vertically pivotable about the coupling with the support structure 124 to enable raising/lowering of the discharge end of the conveyor 112.

The generator 114 comprises an available generator technology and may be included on the offloading car 102 to provide electrical power for operation of the controls in the operator's station 108, operation of the primary and offloading conveyors 110, 112, and/or operation of the hydraulic pump 116. In another embodiment, the generator 114 is omitted and electrical energy is provided to the offloading car 102 from the generator/transfer car 206 or the generator car 106, as described more fully below.

The hydraulic pump 116 comprises an available hydraulic pump or hydraulic pressure generation system. The hydraulic pump 116 is configured to provide sufficient hydraulic pressure for operation of actuators included on the offloading car 102 as well as those disposed on the hopper cars 104 and/or the generator car 106. For example, actuators on the offloading car 102 may function to rotate and pivot the offloading conveyor 112 and actuators on the hopper cars 104 may function to open/close gates, as described below. Although the pump 116 and associated actuators and systems described herein are termed hydraulic, other systems, such as electronic, mechanical, and pneumatic, among others can be employed. In another embodiment, the hydraulic pump 116 is disposed on the generator/transfer car 206, the generator car 106 or on another car in the consist 100. Appropriate connections are provided between the offloading car 102, the hopper cars 104, the generator/transfer car 206, and the generator car 106 to conduct electricity, hydraulic fluids/pressure, and communications between the cars.

As depicted in FIGS. 1 and 2, each hopper car 104 comprises a car frame 126 supported on trucks 127 and a car body 128 disposed thereon. The car body 128 includes an outer wall 130 substantially enclosing a hopper 132 and the hopper conveyor 118 therein. The outer wall 130 may form a portion of the walls of the hopper 128 and may aid to contain dust and debris produced by the offloading process and/or to protect the components from the environment. In another embodiment, the hopper car 104 is constructed without the outer wall 130. In one embodiment, the hopper car 104 is constructed by retrofitting existing bulk freight rail cars, such as open-wagons, box cars, or the like.

The hopper conveyor 118 is disposed on the car frame 126 between the car frame 126 and the hopper 132. The hopper conveyor 118 extends the length of the hopper car 104 and preferably extends a distance beyond each end of the car 104 so as to overlap with conveyors disposed on adjacent hopper cars 104, the offloading car 102, or the generator/transfer car 206 described more fully below.

In some embodiments, a dedicated end car 104' is provided as depicted in FIG. 2. The end car 104' is identical to the hopper cars 104, but the conveyor 118 disposed therein does not extend beyond a rearward end of the end car 104'. As such, the conveyor 118 in the end car 104' will not interfere with or contact other cars coupled to the end car 104'; the conveyor 118 in the hopper cars 104 may obstruct coupling with other cars.

Figure 14:
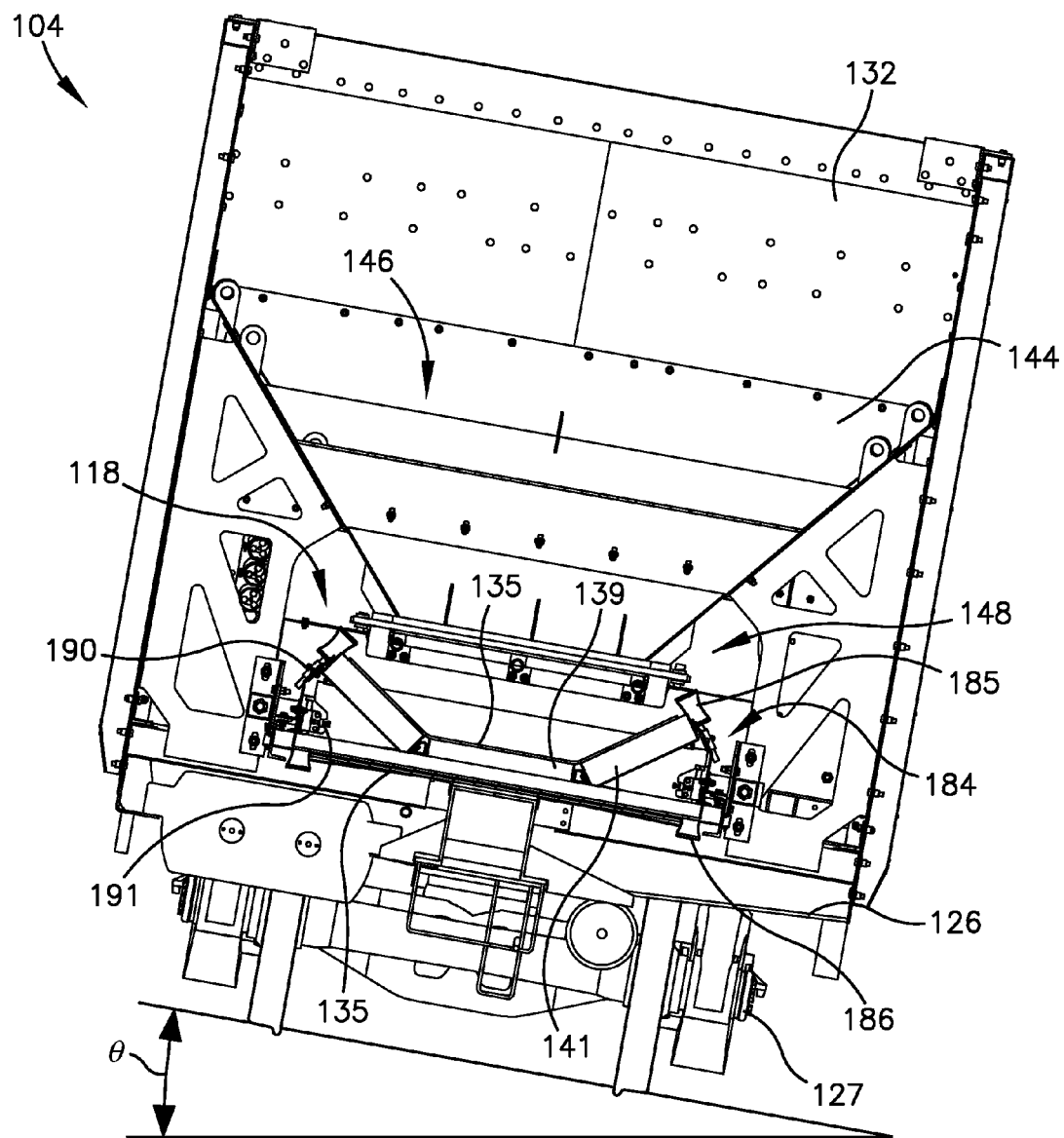
FIG. 14 is an elevational cross-sectional view of a hopper car depicted on a banked curve and including a conveyor guide-roller assembly in accordance with an embodiment of the invention.
Figure 15:
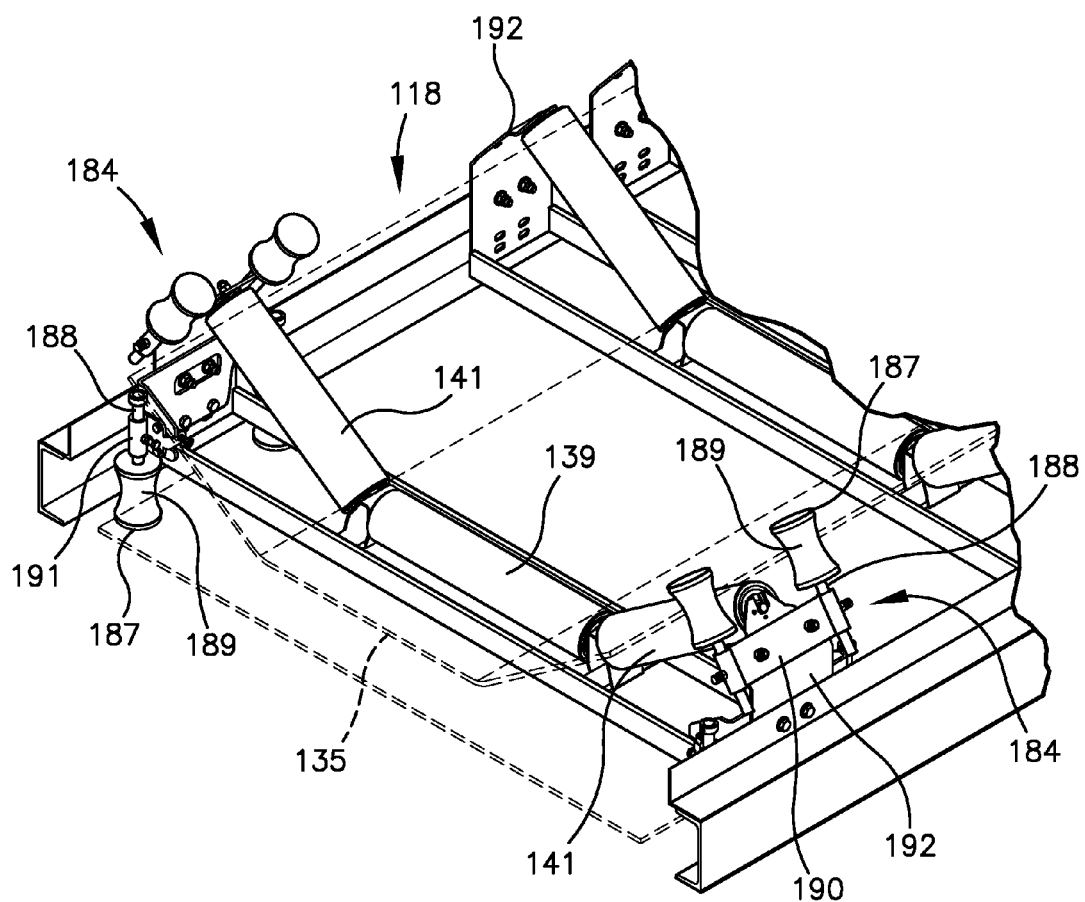
FIG. 15 is an enlarged perspective view of the conveyor guide-roller assembly of the hopper car of FIG. 14.

As shown in FIG. 5, the hopper conveyor 118 extends substantially horizontally from the rear end of the hopper car 104 toward the forward end and includes an upwardly angled portion 134 near the forward end of the hopper car 104. The upward angle and the length of the portion 134 are sufficient to position the forward end of the hopper conveyor 118 above and overlapping with the rearward end of the conveyor on the next adjacent car 102, 104, 206 as shown in FIGS. 1 and 2. The hopper conveyor 118 is preferably a trough-style conveyor in which rollers are provided between upper and lower runs of a conveyor belt 135 to support the upper run of the belt 135 in a generally U-shaped configuration, as shown in FIGS. 14 and 15. Each set of rollers generally includes a horizontally extending central roller 139 and two side rollers 141 angled upward and outward from opposite ends of the central roller 139. It is to be understood that other forms of conveyors are useable in alternative embodiments of the invention. For example, a flat belt conveyor might be employed with sidewalls/guides provided to retain the ballast materials on the belt.

Referring to FIG. 4, the hopper conveyor 118 includes an electric drive motor 136 drivingly coupled to a drive roller or head roller 137. Rotation of drive roller 137 rotates the conveyor belt 135. In some embodiments, the drive motor 136 is configured to enable variable speed operation of the conveyor belt 135. One or more sensors may be included or associated with the motor 136 and the hopper conveyor 118 generally to monitor one or more characteristics of the conveyor's operation. For example, sensors in the motor 136 may monitor the amperage drawn by the motor 136 or other electrical characteristics of the motor's operation. Another sensor 138 may monitor the speed of the conveyor belt 135 while other sensors might be included to monitor characteristics like the weight of material on the conveyor belt 135, or a profile of the material on top of the conveyor belt 135, among a variety of other characteristics.

Figure 18:
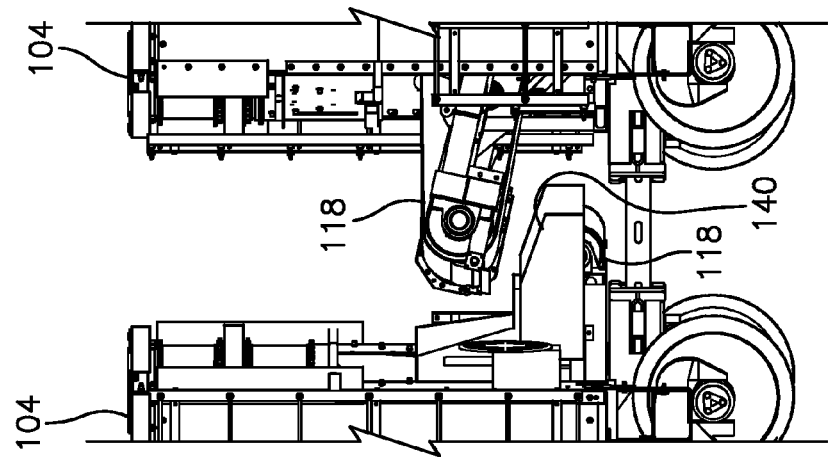
FIG. 18 is a partial side elevational view of the adjacent hopper cars of FIG. 17.
Figure 17:
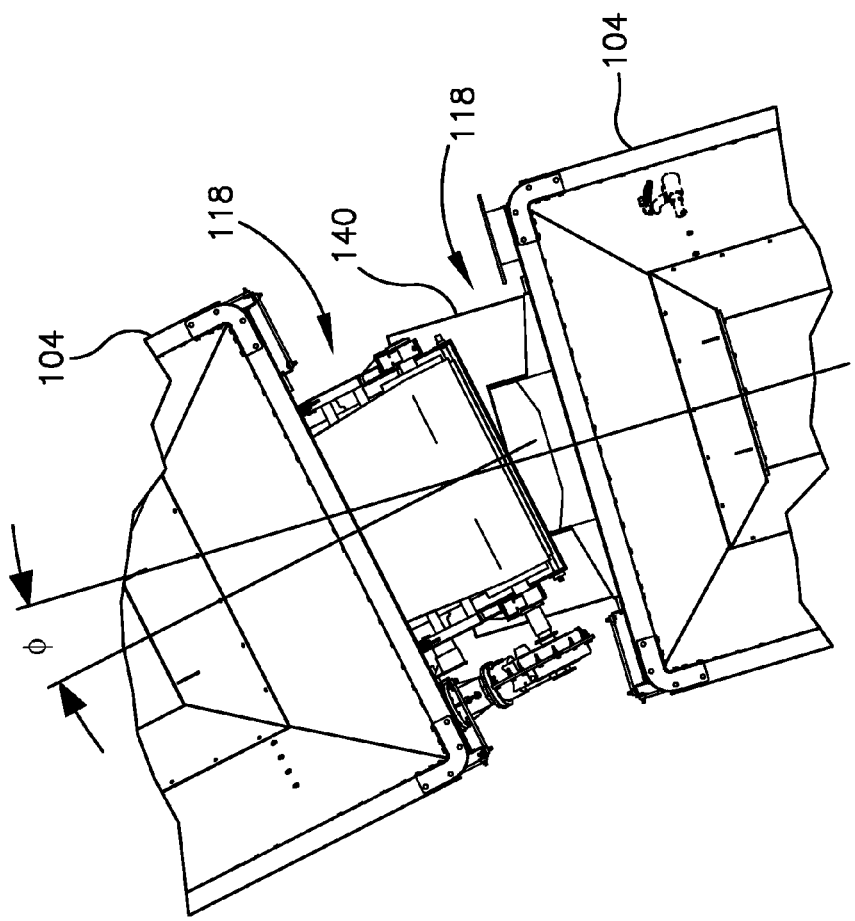
FIG. 17 is a partial top plan view of two adjacent hopper cars showing conveyors thereof in an overlapping configuration for transfer of material between the hopper cars and showing the hopper cars negotiating a curve depicted in accordance with an embodiment of the invention.

The rear end of the hopper conveyor 118 includes an idler roller 139 around which the conveyor belt 135 rotates and may include an intake guide 140. As best seen in FIGS. 17 and 18, the intake guide 140 is configured to guide ballast received from another conveyor onto the hopper conveyor 118 for transport by the conveyor belt 135 toward the forward end of the hopper car 104. The intake guide 140 can take a wide variety of configurations, but generally extends a distance laterally beyond the edges of the conveyor belt 135 and may extend a distance longitudinally beyond the end of the conveyor belt 135. The walls of the intake guide 140 generally slope downwardly toward the upper run of conveyor belt 135 to direct ballast materials toward the center of the belt 135.

The configuration of the forward and rear ends of the hopper conveyor 118 enable transfer of ballast between adjacent hopper cars 104, and/or to or from other cars 102, 206 while the consist 100 is located on a curved section of a rail system, as depicted in FIGS. 17 and 18. The hopper conveyor 118 enables transfer of ballast between cars 102, 104, 206 when positioned on curves in which the heading of immediately adjacent cars 102, 104, 206 varies by greater than 10° or as much as approximately 20° or more, as depicted by the angle (I) shown in FIG. 17, e.g. greater than a 10° curve in the railway. In one embodiment, the hopper conveyor 118 is configured to accommodate curves of up to approximately 13°.

The hopper 132 comprises an open space in the upper portion of the hopper car 104 which may be enclosed or open to the environment above the hopper car 104. The perimeter of an upper part of the hopper 132 is defined by the outer walls 130 of the car 104. A lower part of the hopper 132 includes inwardly angled sidewalls 142 and a plurality of transverse dividers 144. The transverse dividers 144 extend between the angled sidewalls 142 and include a pair of sloped faces facing longitudinally forward and rearward and at angles similar to those of angled sidewalls 142. Preferably the sidewalls 142 and the sloped faces of the dividers 144 are sloped at a downward angle of at least approximately 40° from the horizontal or more preferably between about 50° and about 60°, or about 57°. The downward angle of the sidewalls 142 and the dividers 144 is sufficient to cause the ballast material to flow downward without hanging or collecting on the sidewalls 142 or dividers 144. Together the angled sidewalls 142 and the transverse dividers 144 divide the lower part of the hopper 132 into a plurality of chutes 146. Each chute 146 may also be referred to as a hopper such that each hopper car includes a plurality of hoppers.

The chutes 146 are generally centrally aligned to overlie the center of the hopper conveyor 118. Each of the chutes 146 terminates at a lower end to form an aperture or opening 147 through which ballast materials flow. As shown in FIGS. 4 and 5, the hopper car 104 includes six chutes 146 although any number of chutes 146 may be included. In the embodiment shown five of the chutes 146 overlie the horizontal portion of the hopper conveyor 118 and are generally aligned within a horizontal plane above the hopper conveyor 118 to place the openings 147 generally within a single horizontal plane. A sixth chute 146 overlies the angled portion 134 of the hopper conveyor 118 and is configured to provide an opening 147 that is inclined to lie in a plane that is substantially parallel to the angled portion 134 of the hopper conveyor 118.

A hopper gate 148 is disposed in or across each of the openings 147 to control the flow of ballast through the respective chute 146. With additional reference to FIGS. 5-10, a hopper gate 148 is described in accordance with an embodiment of the invention. FIG. 11 depicts a hopper gate 248 configured similarly to the hopper gate 148 but for installation in the angled sixth chute 146 located at the forward end of the hopper car 104. The features of the hopper gate 248 are thus not described again in detail herein.

The hopper gate 148 is formed on a lower end of a chute extension 150 and includes a base frame 152 and a slide plate 154. The chute extension 150 includes panels 150S (side), 150F (front), 150R (rear) configured to couple to and extend from the respective angled sidewalls 142 and transverse dividers 144 of the chute 146 within which the hopper gate 148 is disposed. The panels 150S, 150F and 150R of the chute extension 150 are preferably disposed at similar angles to that of the sidewalls 142 and dividers 144 but may be provided at one or more steeper or shallower angles. In one embodiment, the base frame 152 of the hopper gate 148 couples directly to the sidewalls 142 and dividers 144 of the chute 146 without the use of the chute extension 150. As shown in FIG. 11, the hopper gate 248 disposed in the forward angled chute 146 of the hopper car 104 includes a chute extension 250 adapted to install the hopper gate 248 in a non-horizontal position.

In one embodiment, one or more of the panels 150S and/or 150F include a flexible or resilient flange (not shown) coupled to a bottom edge thereof. The resilient flange may aid to better seal between the slide plate 154 and the panels 150S and/or 150F to resist material and dust traveling therebetween. The resilient flange may also aid to divert ballast materials flowing therethrough toward the center of the gate opening 160 and thus toward the center of the underlying hopper conveyor 118.

The rear chute extension panel 150R includes a resilient panel or flange 156 coupled beneath a bottom edge thereof. The resilient panel 156 may be coupled to the rear chute extension panel 150R or to another member provided by the chute extension 150 or the base frame 152. The resilient panel 156 is rigidly coupled along a top edge thereof to provide a free hanging bottom edge that can be at least partially flexed in the longitudinal direction of the hopper car 104. The resilient panel 156 may comprise a rubber, plastic, vinyl, composite, or similar resilient material that is at least partially flexible about a rigid coupling. In another embodiment, the resilient panel 156 is pivotably coupled to the hopper gate 148 and may comprise a rigid plate or sheet of material, e.g. the resilient panel 156 may pivot about its coupling with the gate 148 instead of or in addition to flexing.

The base frame 152 is coupled about the lower end of the chute extension 150 and supports the slide plate 154 and one or more actuators 158 for moving the slide plate 154 between closed (FIGS. 7A-B) and open (FIGS. 8A-B) positions relative to a gate opening 160 formed by the chute extension 150.

The slide plate 154 comprises a generally planar section of rigid material dimensioned to fully close off the gate opening 160. The slide plate 154 is preferably formed from a material of sufficient strength and durability to support and resist damage from bulky ballast materials during dumping into the hopper car 104 and storage therein. For example, the slide plate 154 may comprise a plate of 0.5 inch thick steel, among a variety of other material options.

The base frame 152 is configured to support the slide plate 154 in both the open and closed positions and during movement therebetween. Such configurations accommodate slide plates 154 produced from very heavy, stout, and durable materials, such as heavy gage steel plate, and against very heavy loads produced by large, bulky ballast materials carried by the hopper car 104. The base frame 152 includes frame members 162S (side), 162F (front) that extend about the lateral sides and longitudinal front side of the lower perimeter of the chute extension 150. The front frame member 162F extends between the side frame members 162S along the front side of the chute extension 150 and overlies the slide plate 154.

The side frame members 162S have a height sufficient to extend below the slide plate 154 and include a pair of spanning members 164 that extend transversely between the side frame members 162S and beneath the slide plate 154. The spanning members 164 are located forward and rearward of the gate opening 160 so as not to obstruct ballast flowing therethrough. The spanning members 164 support guide rods 166 that extend between the spanning members 164. Guide rod extensions 168 are coupled to the forwardly located spanning member 164 and in alignment with the guide rods 166 to operatively extend the guide rods 166 a distance beyond the base frame 152. Opposite ends of the guide rod extensions 168 are coupled to the structure of the hopper car 104 or to the rearwardly located spanning member 164 of a longitudinally adjacent hopper gate 148. In one embodiment, the guide rods 166 are continuous and extend beyond the forwardly located spanning member 164 and the guide rod extensions 168 are omitted.

As shown in FIGS. 5-10, three guide rods 166 and guide rod extensions 168 are provided. It is understood that any number of guide rods 166 and extensions 168 may be employed in embodiments of the invention. Also as shown in FIGS. 5-10, the central guide rod 166 extends across the gate opening 160. Accordingly, the central guide rod 166 can provide additional support to the slide plate 154 to resist flexing or damage caused by heavy loads placed thereon by overlying ballast materials in the hopper car 104.

Referring to FIG. 9, the slide plate 154 includes followers or glides 170 coupled to a bottom surface thereof in alignment with the respective guide rods 166 and guide rod extensions 168. The glides 170 include a follower surface 172 that is contoured to match the contour of the guide rod 166 and guide rod extension 168 and to be slideable therealong. The glides 170 preferably comprise a low-friction material or wear plate, such as a nylon, plastic, brass, or bronze, among others. The glides 170 thus aid the slide plate 154 to slide along the guide bars 166 and extensions 168 between the open and closed positions. In another embodiment, the glides 170 comprise wheels, bearings, or similar components configured to follow the guide bars 166 and extensions 168 and aid movement of the slide plate 154 therealong.

The slide plate 154 also includes a drive bar 175 coupled to a trailing edge to extend transversely across the slide plate 154 and beyond the lateral edges thereof. The trailing edge is defined relative to movement of the slide plate 154 toward the closed position with the opposite edge being identified as the leading edge. The actuators 158 each couple between a respective end of the drive bar 175 and a respective side frame member 162S. The actuators 158 can thus be actuated to move the slide plate 154 along the guide bars 166 and extensions 168 between the open and closed positions.

When moved to the closed position, the leading edge of the slide plate 154 contacts the lower edge of the resilient panel 156 or moves beneath the lower edge in close proximity thereto. When contacted, the resilient panel 156 may be at least partially flexed in the direction of movement of the slide plate 154 to allow the slide plate 154 to reach the fully closed position. In either configuration, the flexure of the resilient panel 156 enables the slide plate 154 to reach the fully closed position even when ballast materials are present on a top surface of the slide plate 154 and/or attempting to exit through the gate opening 160. Unlike known systems in which the ballast materials may become pinched, trapped, or crushed between doors of a gate and/or the sidewalls of the chute thus preventing the doors from achieving full closure, the resilient panel 156 allows flexure between the slide plate 154 and the chute extension 150.

Ballast materials captured between the leading edge of the slide plate 154 and the resilient panel 156 cause the resilient panel 156 to flex or bend outward but do not prevent the slide plate 154 from moving to the closed position. The trapped materials may be retained in position by the force applied by the resilient plate's bias against flexure, may fall out of the hopper 132 onto the hopper conveyor 118, or may be forced back into the hopper 132 by the resilient plate's bias. The resilient panel 156 resists substantial further exit of ballast materials from the hopper 132. The resilient panel 156 thus resists the ballast materials from exiting the hopper 132 when the slide plate 154 is in the closed position while also allowing the slide plate 154 to move to the closed position without binding on the ballast materials.

As shown in FIG. 5, the hopper car 104 includes a control device 173, such as a computer, programmable logic controller, or similar programmable control unit. The control device 173 may be in electrical communication with control systems housed in the operator's station 108 on the offloading car 102 and may receive commands therefrom. The control device 173 is configured to monitor the operation of the hopper conveyor 118 and the hopper gates 148, 248 on the respective hopper car 104. A control device 173 is preferably provided on each hopper car 104 for control of the individual operations thereof. In another embodiment, control systems may be provided elsewhere on the consist 100 and configured to monitor the operation of each individual hopper car 104. Dedicated control devices 173 on each hopper car 104 may provide additional fail-safes and more reliable control of the operations of the hopper car 104 due to potential communication issues that may arise between cars 102, 104, 106, 206. Operation of the hopper car 104 and control device 173 is described more fully below.

The generator car 106 includes one or more generators 174 and may include a storage bin 176. The generator(s) 174 are configured to produce sufficient electrical energy for powering the hopper conveyors 118 on the hopper cars 104 among other components disposed on the material distribution consist 100. The storage bin 176 comprises a structure configured to house tools, equipment, crew quarters, or other desired gear that may be needed or used by the operator of the consist 100.

As shown in FIG. 2, the generator car 106 may be positioned at the trailing end of the consist 100 so as not to interrupt the transport of ballast materials along the length of the consist 100. In another embodiment shown in FIGS. 1 and 2, a generator/transport car 206 may be provided. The generator/transport car 206 is configured similarly to the generator car 106 but includes a conveyor 178 similar to the hopper conveyors 118. The conveyor 178 is configured to pass beneath the generator 174 or might be configured to pass alongside or over the generator 174 to transport ballast materials received from the hopper car 104 located rearward of the generator/transport car 206 to the hopper car 104 located forward of the generator/transport car 206. The generator 174 and the storage bin 176 (if included) may be raised or suspended above the conveyor 178. The generator/transport car 206 may also include additional hydraulic pumps or the like as necessary to operate the associated systems of the consist 100.

In an embodiment, the generators 174 are configured to provide sufficient electrical power for up to a predetermined number of hopper cars 104. For example, the generator 174 might be configured to power up to thirty hopper cars 104. As such, additional generator cars 106 or generator/transport cars 206 are added to the consist 100 for each additional set of up to thirty hopper cars 104; each additional set of hopper cars 104 being coupled to the rear end of the consist 100. Preferably, the hopper cars 104 are arranged in sets of thirty hopper cars 104 with a generator/transport car 206 disposed halfway through the set, e.g. fifteen hopper cars 104 followed by a generator/transport car 206 followed by another fifteen hopper cars 104. Additional sets of hopper cars 104 and generator/transport cars 206 can then be coupled to the end thereof. It is understood, that other numbers of hopper cars 104 and generator/transport cars 206 may be combined without departing from the scope of embodiments of the invention described herein. Accordingly, the number of hopper cars 104, and thus the capacity, of the consist 100 can be customized to a given application as desired.

Figure 16:
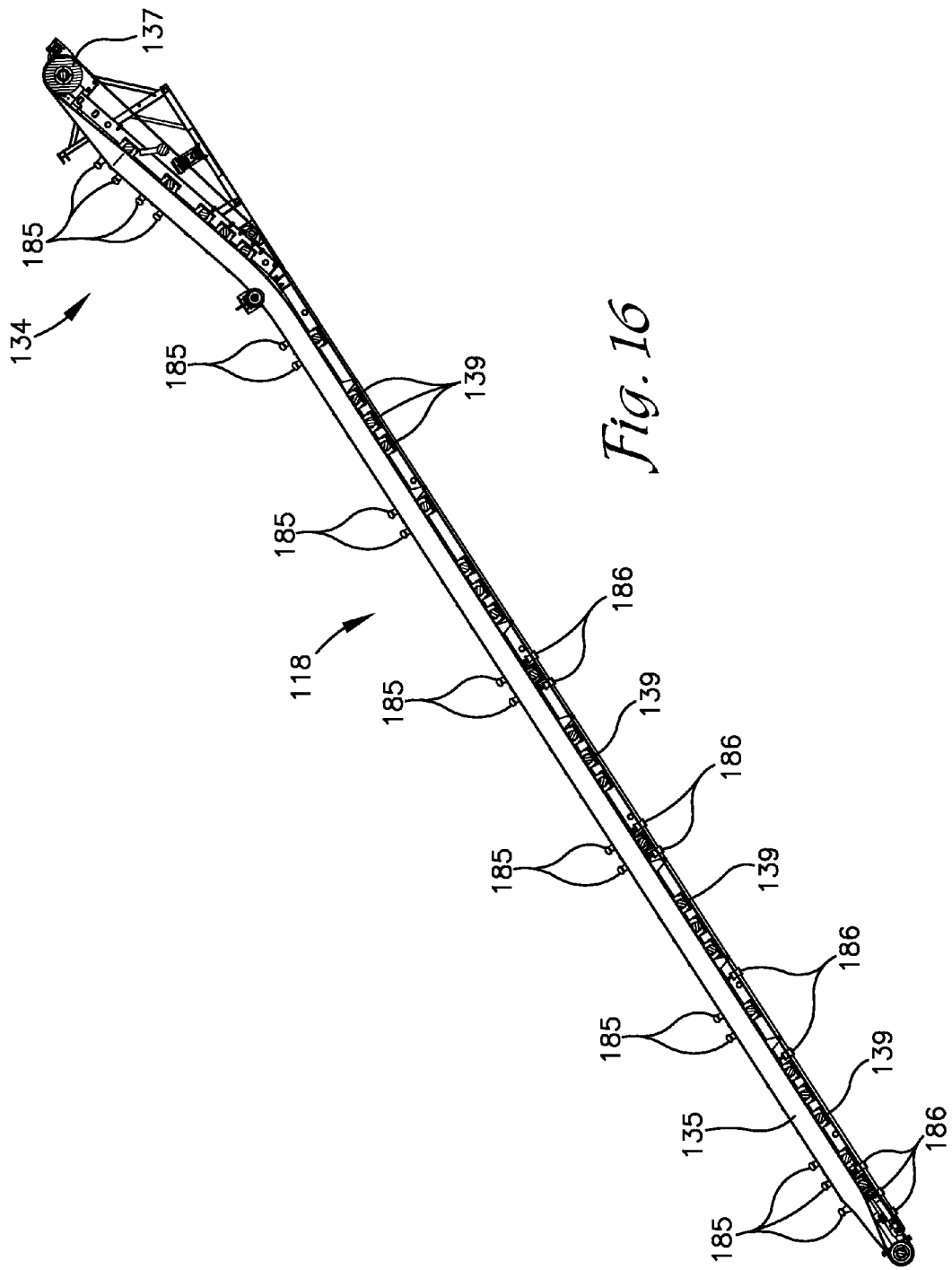
FIG. 16 is a cross-sectional elevational view of a conveyor with a guide-roller assembly incorporated therewith depicted in accordance with an embodiment of the invention.

FIGS. 14, 15, 16 depict a guide-roller assembly 184 configured to enable operation of the hopper conveyor 118 for offloading of ballast materials while one or more of the hopper cars 104 are parked or positioned on a banked curve in the railway. Due to the banking of the curve, the rails and thus the hopper car 104 may lean or tilt to one side at an angle θ relative to the horizontal. The tilting of the hopper car 104 also tilts the hopper conveyor 118 to the side and may create a bias due to gravity on the conveyor belt 135 to move toward the downslope side of the hopper car 104 when moving about the hopper conveyor 118. The guide-roller assembly 184 includes a plurality of feed run guide-rollers 185 and a plurality of return run guide-rollers 186 that retain the conveyor belt 135 in a desired operational position on the hopper conveyor 118.

The feed run and return run guide-rollers 185, 186 may be disposed in sufficient numbers and at selected positions along the length of the hopper conveyor 118 as necessary to sufficiently retain the conveyor belt 135 in the operational position. The guide-rollers 185, 186 may be evenly spaced along the length of the conveyor belt 135, clustered in problem areas, or otherwise arranged. The position of the feed run guide-rollers 185 may correspond with that of the return run guide-rollers 186 or may differ.

FIG. 16 depicts one exemplary configuration of the guide-rollers 185, 186 on the hopper conveyor 118. As shown, the feed run guide rollers 185 are generally evenly spaced in pairs along the length of the central portion of the hopper conveyor 118. A cluster of four feed run guide-rollers 185 is disposed along the angled section 135 of the conveyor 118 and a cluster of three guide-rollers 185 is disposed adjacent an opposite intake end of the conveyor 118. The return run guide-rollers 186 are more sporadically spaced along the return run of the conveyor belt 135; a cluster of three guide-rollers 186 are disposed adjacent the intake end of the conveyor 118, with two single guide-rollers 186 spaced apart and away from the intake end, and two pairs of guide-rollers 186 spaced further along the length of the hopper conveyor 118.

As depicted in FIGS. 14 and 15, the feed and return run guide-rollers 185, 186 include a roller body 187 with an axle 188 extending from one end thereof coaxially with the axis of rotation of the roller body 187. A bearing assembly (not shown) is disposed within the roller body 187 to enable rotational motion of the roller body 187 relative to the axle 188. In another embodiment, the axle 188 is rotationally fixed relative to the roller body 187 and may be coupled to a bearing assembly (not shown) disposed on the hopper conveyor 118 to enable rotational motion of the axle 188 relative to the hopper conveyor 118. The roller body 187 includes an hourglass shape in which a sidewall 189 thereof is inwardly recessed to form a circumferentially extending groove. It is understood that other roller configurations may be employed without departing from the scope of embodiments of the invention.

The guide-roller assembly 184 includes upper and lower mounting assemblies 190, 191 that couple the feed run and return run guide-rollers 185, 186 respectively to the hopper conveyor 118. The mounting assemblies 190, 191 preferably couple to support members 192 that support one or more rollers, e.g. the side rollers 141 and central rollers 139, of the hopper conveyor 118. Or the mounting assemblies 190, 191 may couple to the frame of the hopper conveyor 118 or of the hopper car 104.

The mounting assemblies 190, 191 enable adjustment of the position of the feed run and return run guide-rollers 185, 186 in at least one direction. For example, the mounting assemblies 190, 191 may enable adjustment of the position of the guide-rollers 185, 186 in an axial direction, or longitudinally or laterally relative to the hopper conveyor 118.

The guide-rollers 185, 186 are preferably positioned to contact an edge of the conveyor belt 135 at a location generally centrally within the groove in the sidewall 189. The guide-rollers 185, 186 may be in constant contact with the conveyor belt 135 or may only contact the conveyor belt 135 when the belt 135 drifts away from a normal position. Accordingly, when the hopper car 104 is tilted at the angle θ, the conveyor belt 135 may tend to drift toward the downslope side of the hopper car 104. The edge of the conveyor belt 135 may thus come into contact with the feed run and/or return run guide-rollers 185, 186 and be prevented from drifting out of an operational position by the guide-rollers 185, 186.

The feed run guide-rollers 185 and the return run guide-rollers 186 can be similarly positioned to define an operational position window in which the conveyor belt 135 is retained. Or one or more of the feed run or return run guide-rollers 185, 186 may be positioned to train the conveyor belt 135 or bias the conveyor belt 135 toward a desired operational position. In one embodiment, the feed run guide-rollers 185 are positioned to define a maximum operational position window in which the conveyor belt 135 shall be operated while the return run guide-rollers 186 are positioned closer to the edges of the conveyor belt 135 to guide the belt 135 into a more specific operational position.

Training or realigning the conveyor belt 135 is preferably completed on the return run using the return run guide-rollers 186 because the belt 135 is not loaded with material and is in a generally flat state, e.g. not a trough, and is thus more easily urged toward the desired operational position. For example, the configuration of the guide-rollers 185, 186 depicted in FIG. 16 provides sufficient control of the feed run of the conveyor belt 135 to maintain the belt 135 in an operational position when unloading materials while the hopper car 104 is on a banked curve and enables realignment of the conveyor belt 135 on the return run by the return run guide-rollers 186.

Figure 12:
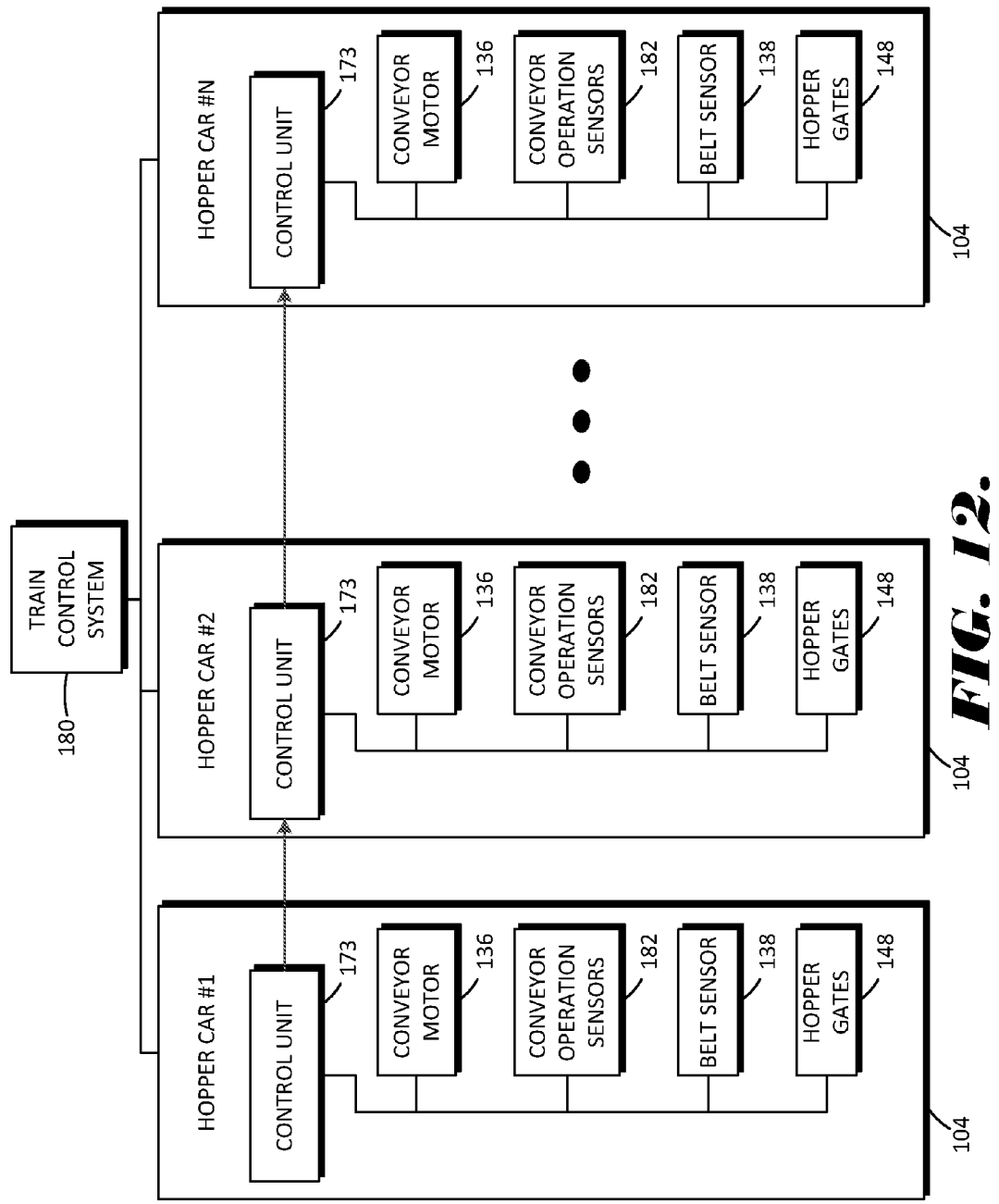
FIG. 12 is a block diagram of a consist control system for a material transport and distribution consist depicted in accordance with an embodiment of the invention.

With reference now to FIG. 12, operation and control of the material distribution consist 100 is described in accordance with an embodiment of the invention. A consist control system 180 is provided, such as in the operator's station 108 to provide overall control of operations of the consist 100. The consist control system 180 may include one or more computing devices, programmable logic controllers, or other devices suitable to execute routines, provide commands, monitor conditions, operate machines, and otherwise oversee and control operations of the consist 100 and the components thereon.

As described previously, each hopper car 104 includes a control device 173 disposed thereon. The control device 173 is in communication with or is operable to control the conveyor drive motor 136 and each of the hopper gates 148 individually. One or more sensors 182 associated with the hopper conveyor 118 and/or the hopper gates 148 provide signals to the control device 173 indicating state and/or operating conditions of the respective conveyor 118 or hopper gate 148. Additionally, the belt sensor 138 associated with the hopper conveyor 118 provides a signal to the control device 173 indicating the speed or movement of the conveyor belt 135. The control device 173 may also be in communication with one or more of the other control devices 173 of each of the other hopper cars 104. Communications between control devices 173 may be direct or may be routed through the consist control system 180.

The control device 173 may control operation of the hopper conveyor 118 in a master-slave fashion as instructed by the consist control unit 180. However, the control device 173 may be authorized to act independently and/or to supersede commands from the consist control system 180 when a fault condition occurs. In such a condition, the control device 173 of a first hopper car 104, e.g. hopper car #1, may operate as an interlock or fail-safe to restrict or control operations of one or more hopper cars 104 positioned further up the path of material flow, e.g. hopper car #'s 2 through N. Accordingly, when the control device 173 of hopper car #1 senses a fault condition, the control device 173 of hopper car #1 can stop operations thereon and can signal to hopper cars #2-N to stop operations as well.

In one exemplary instance, ballast material is being transported from hopper car #2 to hopper car #1 and on to the offloading car 102 along the respective hopper conveyors 118. The control device 173 on hopper car #1 determines that the conveyor motor 136 on hopper car #1 is operating at the desired speed as indicated by the sensor 182 but that the speed of the conveyor belt 135 is indicated to be zero feet/second by the belt sensor 138. Such a condition may be present when the belt 135 has broken and is thus no longer moving but the motor continues to turn or when the belt 135 has been overloaded and the drive wheel of the conveyor motor 136 is slipping. The control device 173 of hopper car #1 identifies this condition as a fault condition and immediately stops operation of the hopper conveyor 118 on hopper car #1 and may close any hopper gates 148 to restrict further ballast material from flowing therefrom. The control device 173 of hopper car #1 also signals the control device 173 of hopper car #2 to indicate the fault condition and cause operations of the conveyor 118 on hopper car #2 to be halted and the gates 148 to close. The operation of the conveyors 118 of each successive hopper car 104 are then halted and the gates 148 closed in a cascading fashion. As such, the overall operation of multiple, successive hopper cars 104 can be halted by the control device 173 of hopper car #1 and a pileup of materials between successive hopper cars 140 can be avoided.

Figure 13:
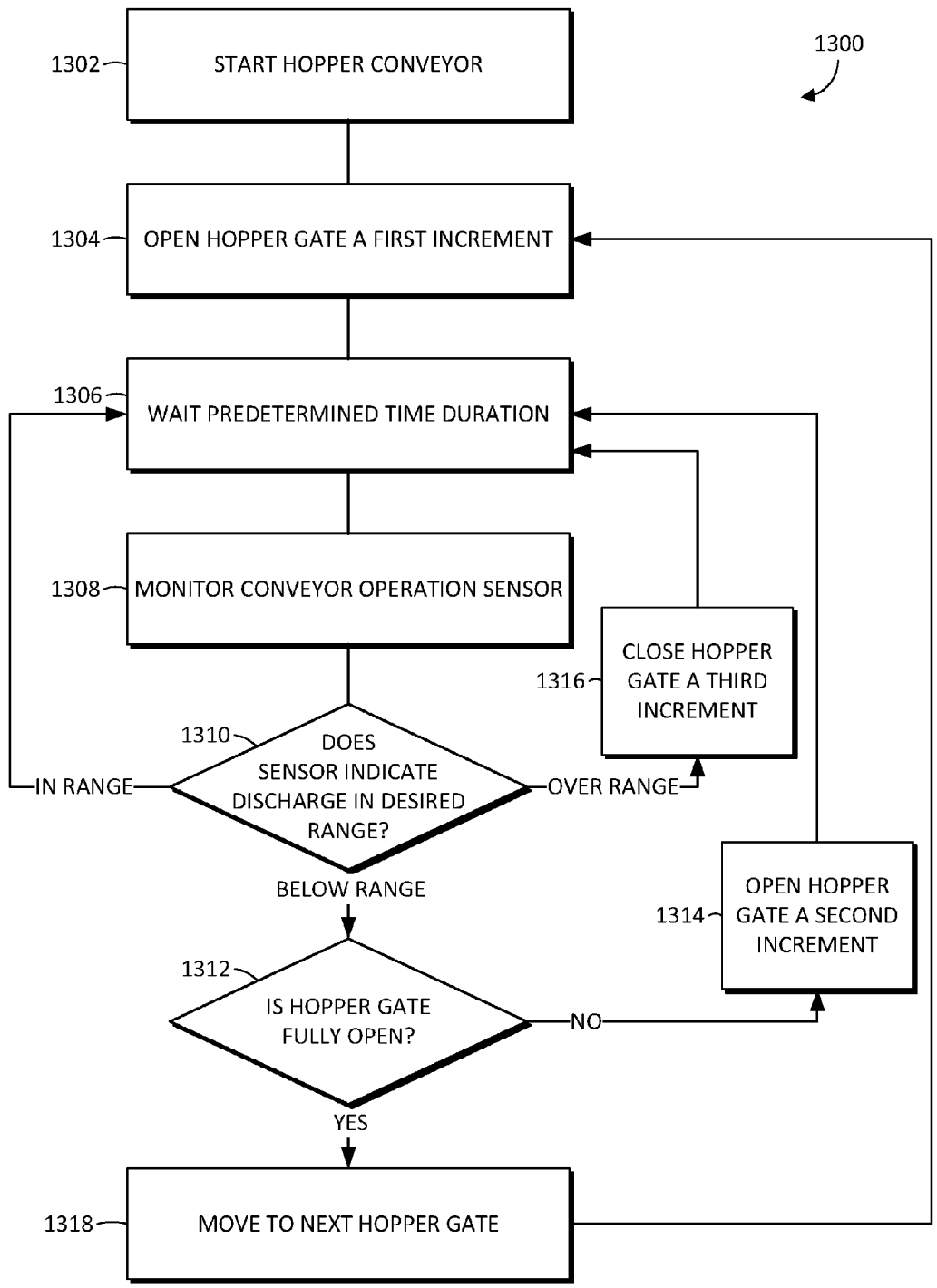
FIG. 13 is a flow diagram depicting a method for offloading a material transport and distribution consist depicted in accordance with an embodiment of the invention.

Referring now to FIG. 13, a method 1300 for operating the consist 100 is shown and described in accordance with an embodiment of the invention. The consist 100 is typically first loaded and transported to a location at which a desired amount of ballast materials are to be offloaded. The ballast materials may be offloaded while the consist 100 is stopped or while the consist 100 is in transit along the tracks. The ballast materials are offloaded alongside the rails for later distribution or installation by a rail maintenance crew. For example, the crew may replace ballast materials under the tracks, dump new or additional ballast on an embankment, or line a drainage system with new materials. The ballast materials might also be offloaded in front of the consist 100 or behind the consist 100 depending on the direction of travel thereof. A plow may be provided to aid movement of the offloaded ballast materials to a desired location or depth and/or to ensure the rails are clear for travel of the consist 100 when offloading in front of the consist 100.

Once on location, one or more of the hopper conveyors 118, the primary conveyor 110, and the offloading conveyor 112 are started. Depending on the sequence by which the hopper cars 104 are to be unloaded, the conveyors 118 on all or only a portion of the hopper cars 104 may be started. For example, if the hopper cars 104 are to be unloaded from the front of the consist 100 to the rear, then only the conveyor 118 of the first hopper car 104 need be started.

The operator in the operator's station 108 controls the offloading process via the consist control system 180. The operator may provide one or more inputs to the system 180 indicating how much ballast material is to be offloaded, an offloading run-time, a number of hopper cars 104 to be offloaded, among a variety of other inputs. In one embodiment, the consist control system 180 is provided with a total weight or mass of ballast material to be offloaded. The consist control system 180 may calculate appropriate offloading characteristics to ensure the proper amount of ballast material is offloaded. For example, the system 180 may be provided with an amount of ballast material in each hopper car 104 or an amount of time required to offload a particular amount of ballast among other data upon which to calculate the offloading parameters. In one embodiment, the system 180 employs the scale 120 in the primary conveyor to aid in determining the amount of ballast material that has been offloaded. The consist control system 180 may also track or identify the amount of ballast material residing on the conveyors 110, 112, 118 at a given time in order to determine when to close the hopper gates 148 so as to offload the desired amount of ballast while also finishing the process with the conveyors 110, 112, 118 being empty.

A first hopper gate 148 is at least partially opened at step 1304. The consist control system 180 can cause the gate 148 to be opened directly or the system 180 may instruct the control unit 173 on the respective hopper car 104 to open the gate 148. The hopper gate 148 is preferably only partially opened. In one instance, the actuators 158 are operated for a predetermined time that corresponds to movement of the slide plate 154 a given predetermined distance. A predetermined time delay is then observed to allow ballast materials to flow from the hopper 132 onto the hopper conveyor 118, as indicated at step 1306.

At step 1308, one or more characteristics of the operation of the hopper conveyor 118 are identified. For example, the conveyor operation sensors 182 may sense an amperage drawn by the conveyor motor 136. The amperage drawn by the motor 136 may be indicative of a load placed on the motor 136 and thus an amount of ballast material that has been deposited on the conveyor belt 135. If the identified characteristic of the conveyor motor 136 indicates that the conveyor 118 is fully loaded or is loaded within a desired level (step 1310), e.g. the amperage drawn is greater than a specified amount, then the method returns to step 1306 and an additional time delay is observed. The additional time delay may be of the same or different duration to the initial time delay.

If the characteristic shows that the conveyor 118 is not loaded to a desired level (step 1310), e.g. the amperage drawn is less than a specified amount, and the hopper gate 148 is not in a fully opened state (step 1312) then the hopper gate 148 is opened by an additional increment, as indicated at step 1314. The additional increment may be based on an additional energizing of the actuators 158 for a given time or a movement of the slide plate 154 a predetermined distance. The method then returns to step 1306. Alternatively, if the characteristic shows that the conveyor 118 is overloaded, e.g. the amperage drawn is greater than a predetermined level, then the hopper gate 148 may be closed by a predetermined increment, as indicated at step 1316. The increment can be the same or different than the increments by which the gate 148 is opened. The method then again returns to step 1306.

If the hopper gate 148 is in a fully opened state (step 1312) then the process begins again with the next hopper gate 148 to be unloaded, as indicated at step 1318. The hopper gates 148 may be opened one-at-a-time or multiples-at-a-time on the same or on multiple hopper cars 104. The gates 148 can be opened in sequence from front to back of the consist 100, in the reverse, or at various intermittent locations along the consist 100 as desired. Additionally, the hopper gates 148 may be closed following step 1316 or may remain open. In one embodiment, the gates 148 remain open until the hopper car 104 is determined to be empty or until the consist 100 is determined to be empty.

At any point in the method 1300, the consist control system 180 may determine that the desired quantity of ballast materials have been released from the hoppers 132, e.g. the quantity of ballast materials offloaded by the offloading car 102 and present on the conveyors 118 is equal to or greater than the desired quantity. The system 180 may thus instruct any open hopper gates 148 to be closed to stop the flow of ballast materials onto the conveyors 118. The control devices 173 of the respective hopper cars 104 may thus cause the hopper gates 148 to be closed by actuating the actuators 158 to move the slide plates 154 to the closed position. In doing so, the resilient panels 156 enable the slide plates 154 to move to the closed position to stop the flow of ballast materials without binding or crushing the ballast materials between the leading edge of the slide plate 154 and the chute extension 150 as described previously above.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A method for unloading a ballast consist, the method comprising:
    opening a first gate to a first extent to enable flow of ballast material from a first hopper onto a first conveyor;
    detecting an amperage drawn by a motor powering the first conveyor;
    opening the first gate to a second extent when the amperage is less than a desired amount, the second extent being greater than the first extent; and
    at least partially closing the first gate when the amperage is greater than the desired amount.

2. The method of claim 1, further comprising:
    determining an amount of ballast deposited on the first conveyor based on the detected amperage.

3. The method of claim 2, further comprising:
    determining a total amount of ballast offloaded from the ballast consist, the total amount including an amount of ballast material offloaded from the ballast consist and an amount of ballast material contained on the first conveyor;
    maintaining the first gate in an at least partially open position when the total amount is less than a desired amount; and
    closing the first gate when the total amount is equal to or greater than the desired amount.

4. The method of claim 3, wherein closing the first gate further comprises:
    deflecting a resilient sidewall of a chute associated with the first gate, the first gate including a slide plate that is slideably moveable relative to the chute to open and close the first gate, deflection of the resilient sidewall enabling movement of the slide plate to close the first gate without binding on ballast material trapped between the slide plate and the resilient sidewall.

5. The method of claim 1, wherein when the amperage is less than the desired amperage, the method further comprising:
    determining that the first gate is fully opened; and
    opening a second gate to the first extent to enable flow of ballast material from a second hopper onto a second conveyor, wherein the second hopper and the second conveyor are the same or different than the first hopper and the first conveyor.

6. The method of claim 1, wherein detecting an amperage further comprises observing a first wait time prior to the detecting.

7. The method of claim 1, further comprising:
    observing a wait time after opening the first gate to the second extent or at least partially closing the first gate;
    detecting a second amperage drawn by the motor;
    opening the first gate to a third extent when the amperage is less than a desired amount, the third extent being greater than the second extent; and
    at least partially closing the first gate when the amperage is greater than the desired amount.

8. The method of claim 1, further comprising:
    detecting a belt speed of the first conveyor disposed on a first hopper car;
    stopping the first conveyor and one or more second conveyors disposed on one or more second hopper cars coupled rearward of the first hopper car when the belt speed of the first conveyor is less than a predetermined belt speed; and
    closing the first gate.

9. The method of claim 1, wherein the ballast consist comprises a plurality of hopper cars and a control car, the first hopper and the first conveyor are included in a first hopper car of the plurality of hopper cars and the first hopper car is located rearward of the control car, the method further comprising:
   conveying the ballast material from the first hopper car forward along the ballast consist to the control car;
   depositing the ballast material onto a control-car conveyor on the control car, the control-car conveyor extending longitudinally along the control car and beneath one or more of a control unit and a generator disposed on the control car;
   conveying the ballast material along the length of the control car and beneath the one or more of the control unit and the generator;
   depositing the ballast material from the control-car conveyor onto a second conveyor on a second hopper car coupled to a forward end of the control car, the control-car conveyor overlapping the second conveyor.

10. The method of claim 1, further comprising:
   positioning the ballast consist at least partially on a banked and curved section of a railway;
   conveying the ballast material between a plurality of hopper cars located on the banked and curved section.

11. The method of claim 10, wherein the railway turns greater than 10° in the curved section.

12. The method of claim 10, further comprising:
   operating the motor to move the conveyor belt along a path extending longitudinally along a first hopper car in the plurality of hopper cars located on the banked and curved section, the path including a forward portion and a return portion;
   retaining the conveyor in the path and against lateral movement caused at least partially by gravity and weight of the ballast materials using a plurality of forward-path guide rollers mounted alongside the forward portion of the path to abut edges of the conveyor; and
   training the conveyor into alignment with the path using a plurality of return-path guide rollers mounted alongside the return portion of the path to abut the edges of the conveyor.

13. The method of claim 1, further comprising:
   conveying the ballast material from the first gate along a substantially horizontal portion of a first conveyor;
   elevating the ballast material by conveying along an upwardly angled portion of the first conveyor, the upwardly angled portion located at a forward end of the first conveyor, the first conveyor including a single belt that forms the horizontal portion and the upwardly angled portion; and
   depositing the ballast material on a substantially horizontal portion of a second conveyor configured substantially similarly to the first conveyor, the first conveyor being disposed on a first car and the second conveyor being disposed on a second car coupled to a forward end of the first car.

14. The method of claim 13, wherein the second conveyor extends a distance beyond a rearward end of the second car and is overlapped by the first conveyor extending from the forward end of the first car.

15. A ballast consist comprising:
   a plurality of hopper cars, each hopper car including a gate, and a longitudinally extending hopper conveyor disposed vertically beneath the gate, a first gate of a first hopper car in the plurality being at least partially open and flowing ballast material from a first hopper onto a first hopper conveyor of the first hopper car, the first hopper conveyor conveying the ballast material forward along the length of the first hopper car;
   a control car coupled forward of the first hopper car and rearward of a second hopper car in the plurality, the control car including
      a control unit instructing operation of the plurality of hopper cars,
      a generator providing power for operation of the plurality of hopper cars, and
      a control-car conveyor extending longitudinally along the length of the control car and beneath one or more of the control unit and the generator,
   the control-car conveyor receiving the ballast material from the first hopper car, conveying the ballast material forward along the length of the control-car and beneath one or more of the control unit and the generator, the control unit determining an amount of ballast material on the first hopper conveyor based on an amperage drawn by a motor driving the first hopper conveyor, and the control unit controlling an open state of the first gate based on the amount of ballast material on the first hopper conveyor.

16. The ballast consist of claim 15, wherein the first hopper car includes a plurality of the gates and a forward gate and the first hopper conveyor includes a substantially horizontal portion that extends longitudinally along the first hopper car vertically beneath the plurality of gates, and the first hopper conveyor includes an upwardly angled portion that extends from a forward end of the horizontal portion to a point beyond a forward end of the first hopper car, and wherein the forward gate is disposed to overlie the upwardly angled portion and is oriented at an angle substantially mimicking that of the upwardly angled portion.

17. The ballast consist of claim 15, further comprising:
   a belt speed sensor operably engaged with a belt of a second hopper conveyor on the second hopper car and detecting a speed of travel of the belt, wherein the control unit receives an indication of the speed of travel detected by the belt speed sensor, the indication indicating a speed of travel less than a predetermined minimum speed, and the control unit providing a command to stop the first hopper conveyor, the second hopper conveyor, and the control-car conveyor and to close the first gate.

18. A method for unloading a ballast consist that includes a first hopper car coupled to a reward end of a control car and a second hopper car coupled to a forward end of the control car, the first and second hopper cars each including a gate and a longitudinally extending hopper conveyor disposed vertically beneath the gate, the control car including a control unit, a generator, and a control-car conveyor disposed vertically beneath one or more of the control unit and the generator, the method comprising:
   opening a first gate of the first hopper car to a first extent to enable flow of ballast material from a first hopper onto a first conveyor;
   detecting an amperage drawn by a motor powering the first conveyor;
   determining an amount of ballast deposited on the first conveyor based on the detected amperage;
   opening the first gate to a second extent when the amperage is less than a desired amount, the second extent being greater than the first extent;
   at least partially closing the first gate when the amperage is greater than the desired amount;
   conveying the ballast material forward along the first hopper car;

depositing the ballast material onto a rearward end of the control-car conveyor;
conveying the ballast material forward along the length of the control car and beneath one or more of the control unit and the generator; and
depositing the ballast material from the control-car conveyor onto a rearward end of a second hopper conveyor of the second hopper car.

19. The method of claim 18, further comprising:
determining a total amount of ballast offloaded from the ballast consist, the total amount including an amount of ballast material offloaded from the ballast consist and an amount of ballast material contained on the first hopper conveyor, the second hopper conveyor, and the control-car conveyor;
maintaining the first gate in an at least partially open position when the total amount is less than a desired amount; and
closing the first gate when the total amount is equal to or greater than the desired amount.

20. The method of claim 18, further comprising:
positioning the first hopper car, the control car, and the second hopper car at least partially on a banked and curved section of a railway, the curved section including a turn of greater than 10.

* * * * *